United States Patent
Yamashita

(10) Patent No.: US 7,452,279 B2
(45) Date of Patent: Nov. 18, 2008

(54) RECORDING MEDIUM OF GAME PROGRAM AND GAME DEVICE USING CARD

(75) Inventor: Nobuyuki Yamashita, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 389 days.

(21) Appl. No.: 10/214,193

(22) Filed: Aug. 8, 2002

(65) Prior Publication Data

US 2003/0060248 A1    Mar. 27, 2003

(30) Foreign Application Priority Data

Aug. 9, 2001    (JP)    ............... 2001-242907

(51) Int. Cl.
A63F 13/00    (2006.01)
A63F 9/24    (2006.01)
(52) U.S. Cl. .................. 463/43; 463/1; 463/8; 463/29; 463/43; 463/44; 463/45; 463/46
(58) Field of Classification Search .................. 463/10, 463/41–46, 25, 1, 8, 29
See application file for complete search history.

(56) References Cited

U.S. PATENT DOCUMENTS 4,432,067 A * 2/1984 Nielsen ..................... 463/44
5,533,124 A * 7/1996 Smith et al. ................. 705/57
5,885,156 A * 3/1999 Toyohara et al. .............. 463/1

(Continued)

FOREIGN PATENT DOCUMENTS

GB    2334456 A * 8/1999

OTHER PUBLICATIONS

Arika, 'Street Fighter EX3', Capcom via www.gamespot.com [online], Oct. 24, 2000 [retrieved on Sep. 12, 2005]. Retrieved from the Internet: <URL:http://www.gamespot.com/ps2/action/streetfighterex3/review.html>.*
Capcom USA, Inc, Street Fighter II Turbo:Instruction Manual, 1993, Capcom USA., Inc. p. 1-39.*

(Continued)

*Primary Examiner*—Robert Pezzuto
*Assistant Examiner*—Ryan Hsu
(74) *Attorney, Agent, or Firm*—Finnegan, Henderson, Farabow, Garrett & Dunner, L.L.P.

(57) ABSTRACT

By setting the player's recording medium in the game device, the continuity of the previous game and current game of the player is maintained, and the game parameter of a non-player character is set with a used recording medium. The game device (30) has a unit (S24) for conducting a first game in which a plurality of characters participate including a player character and a non-player character upon using a recording medium (20) having recorded thereon the number of playable games; a unit (S26) for recording the game parameter of the player character renewed with the first game on the recording medium and deducting the number of playable games; a unit (S53) for using the recording medium to set the game parameter of the non-player character in the second game when there is a remainder in the number of playable games in the recording medium; and a unit (S57) for using the recording medium to set the game parameter of the non-player character in the second game when there is no remainder in the number of playable games in the recording medium.

5 Claims, 22 Drawing Sheets

U.S. PATENT DOCUMENTS

| | | | | |
|---|---|---|---|---|
| 5,971,855 | A * | 10/1999 | Ng | 463/42 |
| 6,009,458 | A * | 12/1999 | Hawkins et al. | 709/203 |
| 6,374,208 | B1 * | 4/2002 | Ferris et al. | 703/27 |
| 6,425,828 | B2 * | 7/2002 | Walker et al. | 463/42 |
| 6,468,162 | B1 * | 10/2002 | Nakamura | 463/43 |
| 6,595,853 | B1 * | 7/2003 | Osawa | 463/20 |
| 6,601,851 | B1 * | 8/2003 | Sakamoto et al. | 273/308 |
| 6,631,522 | B1 * | 10/2003 | Erdelyi | 725/53 |
| 6,692,360 | B2 * | 2/2004 | Kusuda et al. | 463/42 |
| 6,716,102 | B2 * | 4/2004 | Whitten et al. | 463/43 |
| 6,743,099 | B2 * | 6/2004 | Yabe et al. | 463/36 |
| 6,758,746 | B1 * | 7/2004 | Hunter et al. | 463/9 |
| 6,769,989 | B2 * | 8/2004 | Smith et al. | 463/41 |
| 7,115,031 | B2 * | 10/2006 | Miyamoto et al. | 463/1 |
| 2002/0052238 | A1 * | 5/2002 | Muroi | 463/40 |

OTHER PUBLICATIONS

Squaresoft, 'Final Fantasy VIII', 1999, Square Electronic Arts L.L.C., see entire document.*

Examiner's Affidavit, "Final Fantasy VIII", see entire document.*

"Seeking for Optimal Solution—Genetic Algorithm, Part 3: Application of the Genetic Algorithm," C Magazine, No. 9, 1999, vol. 11, No. 9, Softbank Publishing Corp., Sep. 1, 1999, pp. 30-34.

"Virtual Fighter 4," Arcadia Magazine, No. 9, 2001, vol. 2, No. 8, Enterbrain, Inc., Aug. 1, 2001, pp. 36-37.

"Cyber Troopers Virtual-On Force," Monthly Amusement Journal, No. 8, 2001, vol. 1, No. 4, Yugenkaisha Amusement Journal, Jul. 30, 2001, p. 204.

Notice of Reasons for Refusal, dated Jun. 29, 2006, Japanese Patent Office, Partial.

* cited by examiner

FIG.9

[SHOOTING ATTACK]

| METHOD ON INCREASING EXPERIENTIAL VALUE | DAMAGE VALUE OF THE TWO ENEMY ROBOTS WHEN SHOT FROM THE PLAYER ROBOT IS DIVIDED BY 100 AND ADDED |
|---|---|

| LV | PRESCRIBED EXPERIENTIAL VALUE | CONDITIONS FOR RAISING THE LEVEL |
|---|---|---|
| 1 | 50 | USE ALL THREE TYPES OF LRB ORDINARY ATTACK DURING ONE SET |
| 2 | 80 | USE AT LEAST ONE TURBO ATTACK DURING ONE SET |
| 3 | 128 | WIN ONE BATTLE |
| 4 | 205 | USE A VERTICAL TURN THREE TIMES DURING ONE SET |
| 5 | 328 | USE A JUMP ATTACK FIVE TIMES DURING ONE SET |
| 6 | 524 | USE A FRONT DASH ATTACK FIVE TIMES DURING ONE SET |
| 7 | 839 | USE A VERTICAL TURN FIVE TIMES DURING ONE SET |
| 8 | 1342 | USE THREE TYPES OF LRB TURBO ATTACK DURING ONE SET |
| 9 | 2147 | USE AN OBLIQUE FRONT DASH ATTACK TWICE DURING ONE SET |
| 10 | 3436 | USE A DASH ATTACK OF ALL DIRECTIONS DURING ONE SET |
| 11 | 5498 | USE A MIDAIR DASH ATTACK THREE TIMES DURING ONE SET |
| 12 | 8796 | USE ALL THREE TYPES OF CROUCHING LRB DURING ONE SET |
| 13 | 14074 | MAKE A PERFECT WIN THROUGHOUT ONE SET |
| 14 | 22518 | WIN FIVE CONSECUTIVE BATTLES |
| 15 | | |

[SHOOTING DEFENSE]

| METHOD ON INCREASING EXPERIENTIAL VALUE | DAMAGE VALUE OF THE PLAYER ROBOTS WHEN SHOT IS DIVIDED BY 100 AND ADDED |
|---|---|

| LV | PRESCRIBED EXPERIENTIAL VALUE | CONDITIONS FOR RAISING THE LEVEL |
|---|---|---|
| 1 | 50 | |
| 2 | 80 | MAKE AN ORDINARY MOVE IN ALL DIRECTIONS OF FRONT, BACK, LEFT AND RIGHT DURING ONE SET |
| 3 | 128 | |
| 4 | 205 | DASH IN ALL DIRECTIONS OF FRONT, BACK, LEFT, RIGHT AND DIAGONAL DURING ONE SET |
| 5 | 328 | |
| 6 | 524 | MIDAIR DASH IN ALL DIRECTIONS OF FRONT, BACK, LEFT, RIGHT AND DIAGONAL DURING ONE SET |
| 7 | 839 | |
| 8 | 1342 | JUMP CANCEL TEN TIMES DURING ONE SET |
| 9 | 2147 | |
| 10 | 3436 | DASH AND MIDAIR DASH IN ALL DIRECTIONS DURING ONE SET |
| 11 | 5498 | |
| 12 | 8796 | AVOID GETTING HIT FOR TWO CONSECUTIVE SETS |
| 13 | 14074 | |
| 14 | 22518 | DASH AND MIDAIR DASH IN ALL DIRECTIONS DURING ONE SET |
| 15 | | |

FIG.10

[PROXIMAL ATTACK]

| METHOD ON INCREASING EXPERIENTIAL VALUE | PROXIMAL DAMAGE VALUE INFLICTED ON THE ENEMY IS DIVIDED BY 100 AND ADDED |
|---|---|

| LV | PRESCRIBED EXPERIENTIAL VALUE | CONDITIONS FOR RAISING THE LEVEL |
|---|---|---|
| 1 | 60 | MAKE ONE SUCCESSFUL HIT OF A PROXIMAL ATTACK DURING ONE SET |
| 2 | 96 | MAKE TWO SUCCESSFUL HITS OF A PROXIMAL ATTACK DURING ONE SET |
| 3 | 154 | MAKE THREE SUCCESSFUL HITS OF A PROXIMAL ATTACK DURING ONE SET |
| 4 | 246 | MAKE TWO SUCCESSFUL HITS ON A TURBO ATTACK DURING ONE SET |
| 5 | 393 | MAKE SUCCESSFUL HITS OF THREE TYPES OF LRB PROXIMAL ATTACKS DURING ONE SET |
| 6 | 629 | MAKE THREE SUCCESSFUL HITS OF A TURBO PROXIMAL SHOT DURING ONE SET |
| 7 | 1007 | MAKE THREE SUCCESSFUL HITS OF A FRONT TURBO PROXIMAL SHOT DURING ONE SET |
| 8 | 1611 | MAKE TWO SUCCESSFUL HITS OF AN UPPER PROXIMAL SHOT DURING ONE SET |
| 9 | 2577 | MAKE TWO SUCCESSFUL HITS OF A SMALL JUMP PROXIMAL SHOT DURING ONE SET |
| 10 | 4123 | MAKE ONE SUCCESSFUL HIT ON THE SECOND ORDINARY PROXIMAL SHOT DURING ONE SET |
| 11 | 6597 | MAKE ONE SUCCESSFUL HIT OF A FRONT DASH CENTER PROXIMAL SHOT DURING ONE SET |
| 12 | 10555 | MAKE TWO SUCCESSFUL HITS OF A DOWN PROXIMAL SHOT DURING ONE SET |
| 13 | 16888 | MAKE TWO SUCCESSFUL HITS OF A TURBO PROXIMAL SHOT AGAINST A GUARDED ENEMY |
| 14 | 27022 | WIN FIVE CONSECUTIVE BATTLES |
| 15 | | |

[PROXIMAL DEFENSE]

| METHOD ON INCREASING EXPERIENTIAL VALUE | *WHEN HIT BY AN ENEMY'S PROXIMAL ATTACK=PROXIMAL DAMAGE DIVIDED BY 100<br>*WHEN ABLE TO GUARD THE ENEMY'S PROXIMAL ATTACK= DAMAGE VALUE OF GUARDED PROXIMAL SHOT DIVIDED BY 50 |
|---|---|

| LV | PRESCRIBED EXPERIENTIAL VALUE | CONDITIONS FOR RAISING THE LEVEL |
|---|---|---|
| 1 | 80 | |
| 2 | 128 | GUARD ONCE THE ENEMY'S PROXIMAL ATTACK DURING ONE SET |
| 3 | 205 | |
| 4 | 328 | NEVER GET HIT BY THE ENEMY'S PROXIMAL ATTACK DURING ONE SET |
| 5 | 524 | |
| 6 | 839 | USE TWO GUARD REVERSAL ATTACKS DURING ONE SET |
| 7 | 1342 | |
| 8 | 2147 | GUARD FIVE TIMES THE ENEMY'S PROXIMAL ATTACK DURING ONE SET |
| 9 | 3436 | |
| 10 | 5498 | USE THREE GUARD REVERSAL ATTACKS DURING ONE SET |
| 11 | 8796 | |
| 12 | 14074 | USE FOUR GUARD REVERSAL ATTACKS DURING ONE SET |
| 13 | 22518 | |
| 14 | 36029 | AVOID GETTING HIT FOR TWO CONSECUTIVE SETS(INCLUDING SHOTS) |
| 15 | | |

FIG.11

[THINKING CLOCK]

| METHOD ON INCREASING EXPERIENTIAL VALUE | NUMBER OF SORTIE SETS WILL BE ADDED |
|---|---|

| LV | PRESCRIBED EXPERIENTIAL VALUE | CONDITIONS FOR RAISING THE LEVEL |
|---|---|---|
| 1 | 10 | |
| 2 | 16 | |
| 3 | 26 | |
| 4 | 41 | |
| 5 | 66 | |
| 6 | 105 | |
| 7 | 168 | |
| 8 | 268 | |
| 9 | 429 | |
| 10 | 687 | |
| 11 | 1100 | |
| 12 | 1759 | |
| 13 | 2815 | |
| 14 | 4504 | |
| 15 | | |

[TAG TEAM APTITUDE]

| METHOD ON INCREASING EXPERIENTIAL VALUE | LIFE AMOUNT PASSED OVER DURING THE RESCUE DIVIDED BY 100 WILL BE ADDED |
|---|---|

| LV | PRESCRIBED EXPERIENTIAL VALUE | CONDITIONS FOR RAISING THE LEVEL |
|---|---|---|
| 1 | 25 | |
| 2 | 38 | |
| 3 | 56 | |
| 4 | 84 | |
| 5 | 127 | |
| 6 | 190 | |
| 7 | 285 | |
| 8 | 427 | |
| 9 | 641 | |
| 10 | 961 | |
| 11 | 1442 | |
| 12 | 2162 | |
| 13 | 3244 | |
| 14 | 4865 | |
| 15 | | |

FIG.17

MISSION OCCURRENCE CONDITIONS

| BASIC COMBAT TRAINING | NO CONDITIONS. SELECTABLE AT ANY TIME WITH A VENDOR. |
|---|---|
| WELCOME TO THE MARS BATTLEFIELD!! | NO CONDITIONS. PLAYABLE AT ANY TIME WITH TWIN DEVICES. |
| TOP LEVEL FORCED RECONNAISSANCE COMMAND | OCCURS WHEN TOTAL COMBAT TIME REACHES 2 HOURS, 6 HOURS, 10 HOURS, 14 HOURS, 18 HOURS.. |
| SPECIAL EXERCISE- SPECIAL PRIMARY LIMITED SITUATION ASSUMED | OCCURS WHEN TOTAL COMBAT TIME REACHES 3 HOURS, 7 HOURS, 11 HOURS, 15 HOURS, 19 HOURS.. |
| SPECIAL EXERCISE- SPECIAL SECONDARY LIMITED SITUATION ASSUMED | OCCURS WHEN TOTAL COMBAT TIME REACHES 4 HOURS, 8 HOURS, 12 HOURS, 16 HOURS, 20 HOURS.. |
| SPECIAL EXERCISE- SPECIAL TERTIARY LIMITED SITUATION ASSUMED | OCCURS WHEN TOTAL COMBAT TIME REACHES 5 HOURS, 9 HOURS, 13 HOURS, 17 HOURS, 21 HOURS.. |
| TOP LEVEL SPECIAL COMMAND- ATTACK SHADOW (NAME OF ENEMY CHARACTER) | WHEN 5 V DISKS ARE OBTAINED |
| TOP LEVEL SPECIAL COMMAND- ATTACK YAGARANDE (NAME OF ENEMY CHARACTER) | WHEN 5 CRYSTALS ARE OBTAINED |

FIG.22

> FORCEDLY GO VERSUS ON
    FGV ON 17:00
    FGV OFF 0:00

GAME ASSIGN

RECORDING MEDIUM OF GAME PROGRAM AND GAME DEVICE USING CARD

BACKGROUND OF THE INVENTION

1. Field of the Invention

The present invention relates to a video game system, and in particular to a video game system to be played upon making a character in which a player operates the movement thereof (hereinafter referred to as a "player character"), and a character controlled by an opponent player or a computer battle on a display screen.

2. Description of the Related Art

An example of a video game battle game system is introduced, for example, in Japanese Patent Application No. H11-51538 (PCT/JP98/04060). With this system, a player operates one's player character and battles the non-player character operated by another player or a computer. Moreover, the player and the other player or computer can pair up to battle a plurality of other players or a computer in groups. The game devices operated by the respective players are mutually connected with a communication line, and the game development in the virtual space may be enjoyed from the individual viewpoint of each player (viewpoint of the character operated by each player or the viewpoint from the backside of the character).

SUMMARY OF THE INVENTION

Nevertheless, with a conventional video game device, since a game is completed for each battle, the scope of progress within such a game will be limited to a certain degree. It is desirable to provide a game corresponding to the achievement of the player's game skill level, and to offer a difficulty level to the game stages and provide a game in which the game stage is improved in incremental steps. However, with a game device targeting the general public, it is difficult to reflect the game scores and results of the player in the subsequent game since it is difficult to specify the individual players.

Thus, an object of the present invention is to provide a game program or game device capable of offering a battle game having continuity between the previous battle game and the current battle game.

Moreover, another object of the present invention is to provide a game program or game device capable of maintaining continuity of the game parameter of the previous game and current game by employing an information recording medium having recorded thereon play data of the player.

Further, still another object of the present invention is to provide a game program or game device capable of offering a game utilizing the game parameter recorded on the information recording medium.

In order to achieve the foregoing objects, the game program of the present invention makes a computer system function as: game deployment means for conducting a game in which a plurality of characters participate including a player character operated by a player and a non-player character which moves independent of the player's operation upon using a recording medium capable of recording play data containing at least the game parameter; play data generation means for renewing the game parameter of the player character in accordance with the contents of the game of the player and making this the play data; recording means for recording the play data on the recording medium; and non-player character setting means to be used for setting, when a prescribed condition is satisfied in the game, a part or the whole of the parameter for deciding a part or the whole of the play data recorded on the recording means, and at least one among the operation, performance and appearance of the non-player character.

According to the foregoing structure, play data of the player character operated by the player can be used as play data of the non-player character in order to enjoy a game with the non-player character as one's partner which reflects the game results and the like of the player.

Preferably, the prescribed condition includes at least one among the number of times the play data has been recorded on the recording medium, number of times the player played the game, play time, number of times the game has been cleared or has become game over, number of victories or defeats in the game, and score or experiential value obtained during the game play. Thereby, recorded data on the recording medium can be used as data for setting the non-player character only in certain cases. For example, when the number of possible sorties (number of playable games) of the player's card becomes 0, such card may be used as the AI card for setting the parameter of this card as the game parameter of the non-player character (partner character) operated by a computer or another player. By using the converted card as an AI card thereafter in the game device, the battle robot can lift off as the AI partner character of the player character.

Moreover, the game program of the present invention makes a computer system function as: game deployment means capable of deploying at least a first game and a second game in which a plurality of characters participate including a player character operated by a player and a non-player character which moves independent of the player's operation upon using a recording medium capable of recording play data containing at least the game parameter; recording means for renewing and recording the play data on the recording medium in accordance with the play contents or play results of the first game by the player; and game selection means for reading the play data from the recording medium and, when the play data of the first game corresponds to a predetermined condition, making the game deployment means deploy the second game.

According to the foregoing structure, a player who achieves specific game results will be able to experience a special game stage (second game). Further, it will become possible to provide guidance of a game stage corresponding to the characteristics of the game results or the like of the player; for instance, guidance for participation in a drill procedure of specific operations and maneuvers.

Moreover, the game program of the present invention makes a computer system function as: game deployment means capable of deploying at least a first game and a second game in which a plurality of characters participate including a player character operated by the player and a non-player character which moves independent of the player's operation upon using a recording medium capable of recording play data containing at least the game parameter; recording means for renewing and recording the play data on the recording medium in accordance with the play contents or play results of the first game by the player; game selection means for reading the play data from the recording medium and, when the play data of the first game corresponds to a predetermined condition, making the game deployment means deploy the second game; and time limit means for deploying the second game in a prescribed time frame.

According to the foregoing structure, for example, in order to realize the desires of a customer who wishes to enjoy a one-player mode and a customer who wishes to enjoy a battle mode, the execution of the forced battle mode depending on the time frame can be set. Further, a special game stage (second game) can be played while avoiding the time frame in which the game is overcrowded with users.

Preferably, the recording means further records at least one among the execution of the second game, number of executions, success or failure, and number of times of success or failure as the play data on the recording medium. It thereby becomes possible to evaluate the results of the previous second game.

Preferably, the player character and the non-player character jointly advance the game. Thereby, the player may enjoy a battle game or the like with the non-player character as one's partner.

Preferably, the recording medium includes a magnetic card or an IC card. The player may thereby take along the recording medium and enjoy a game having continuity in a (separate) game device at a different location by using the accumulated game data.

Preferably, at least one among the first and second games is a battle game, and the player character and the non-player jointly battle a character operated by another player, or a character which moves pursuant to the control of a control means.

Preferably, the game parameter includes at least one among the respective parameters of the player character's shooting attack, shooting defense, proximal attack, proximal defense, tag team aptitude and adequate a disposition. Thereby, the play contents of the player are evaluated, and the game parameter value of the player character is either renewed or accumulated. Since the game parameter is recorded on the card, it is possible to set and use the game parameter of the first game in the second game, and to repeat the improvement of the game parameter.

Preferably, the renewable number of times of the play data to be recorded on the recording medium is limited to a prescribed number of times, and the number of times the play data has been renewed or the remainder of the renewable number of times is recorded on the recording medium. It is thereby possible to prevent a specific player from monopolizing the use of the game device for a long period of time.

Preferably, an image or the like of the game character is made formable on the recording medium (magnetic card or IC card for example) with printing and so forth. Further, a recording medium having printed thereon a design corresponding to the character to be recorded on the recording medium may be withdrawn. It thereby becomes possible to identify the type of character (battle robot) recorded on the recording medium. Moreover, there is an added enjoyment of collecting the recording medium itself (various characters).

In addition, the settable number of times of the non-player character employing the play data recorded on the recording medium can be limited to a prescribed number of times. It thereby becomes possible to avoid the play data of a specific player from proliferating as the set data of the non-player character.

Moreover, the game program of the present invention makes a computer system function as: game progress means for conducting a game in which a plurality of characters participate including a player character operated by the player and a non-player character which moves independent of the player's operation upon using a recording medium capable of recording play data containing at least a restrictive condition for restricting the use of the game and a game parameter; recording means for renewing and recording the play data in the recording medium in accordance with the results of the game of the player; and non-player character setting means to be used for recording on the recording medium, when the use of the game corresponds to the restrictive condition recorded on the recording medium, an AI level value corresponding to the play data, a part or the whole of the game parameter of the player character, and an AI program for moving the non-player character as the game data of the non-player character, and making the recording medium the recording medium for controlling an AI non-player character.

According to the foregoing structure, the recording medium which becomes used upon falling under a condition such as being used a prescribed number of times can be utilized to record the game parameter or the like of the non-player character, and, by using this as the recording medium of the game data or the like of an AI character, such data can be reflected as the operational performance of the backup robot (AI character) or the player.

Preferably, the restrictive condition includes the number of playable games. It is thereby possible to end the game when the player's game count exceeds the game count recorded on the recording medium. It is further possible to identify the used and finished recording medium and to use the used recording medium.

Preferably, the recording medium includes at least one among a magnetic card, IC card, IC memory, PCMCIA card, portable telephone device, and network server.

Moreover, the game device of the present invention for achieving the foregoing objects is a game device for conducting a game in which a plurality of characters participate including a player character operated by a player and a non-player character which moves independent of the player's operation, the game device comprising: play data generation means for renewing a part or the whole of the game parameter of the player character in accordance with the game play contents of the player and making this the play data; recording means for recording the play data on the recording medium set in the game device; and non-player character setting means to be used for setting, when a prescribed condition is satisfied in the game, a part or the whole of the parameter for deciding a part or the whole of the play data recorded on the recording means, and at least one among the operation, performance and appearance of the non-player character.

According to the foregoing structure, play data of the player character operated by the player can be used as play data of the non-player character in order to enjoy a game with the non-player character as one's partner which reflects the game results and the like of the player.

Preferably, the prescribed condition includes at least one among the number of times the play data has been recorded on the recording medium, number of times the player played the game, play time, number of times the game has been cleared or has become game over, number of victories or defeats in the game, and score or experiential value obtained during the game play. Thereby, recorded data on the recording medium can be used as data for setting the non-player character only in certain cases. For example, when the number of possible sorties (number of playable games) of the player's card becomes 0, such card may be used as the AI card for setting the parameter of this card as the game parameter of the non-player character (partner character) operated by a computer or another player. When making a sortie thereafter with the AI card, the converted card can be used to lift off the partner character of the player character.

Preferably, when the play data falls under a predetermined condition, a second game corresponding to such condition is executed. Thereby, a player who achieves specific game results will be able to experience a special game stage (second game). Further, it will become possible to provide guidance of a game stage corresponding to the characteristics of the game results or the like of the player; for instance, guidance for participation in a drill procedure of specific operations and maneuvers.

Preferably, the prescribed condition further includes at least one among the execution count or the success/failure count of the second game. It thereby becomes possible to evaluate the results of the previous second game.

Preferably, the second game is only playable for a predetermined time frame. Thereby, for example, in order to realize the desires of a customer who wishes to enjoy a one-player mode and a customer who wishes to enjoy a battle mode, the execution of the compulsory battle mode depending on the time frame can be set. Further, a special game stage (second game) can be played while avoiding the time frame overcrowded with users.

Preferably, the recording means further records at least one among the execution of the second game, number of executions, success or failure, and number of times of success or failure as the play data on the recording medium. It thereby becomes possible to evaluate the results of the previous second game.

Preferably, the non-player character is a character controlled with the game control means in the game device, and jointly advances the game together with the player character. Thereby, the player may enjoy a battle game or the like with the non-player character as one's partner.

Preferably, the recording medium includes a magnetic card or an IC card. The player may thereby take along the recording medium and enjoy a game having continuity in a (separate) game device at a different location by using the accumulated game data.

Preferably, at least one among the first and second games is a battle game, and the player character and the non-player jointly battle a character operated by another player.

Preferably, the game parameter includes at least one among the respective parameters of the player character's shooting attack, shooting defense, proximal attack, proximal defense, tag team aptitude and adequate disposition. Thereby, the play contents of the player are evaluated, and the game parameter value of the player character is either renewed or accumulated. Since the game parameter is recorded on the card, it is possible to set and use the game parameter of the first game in the second game, and to repeat the improvement of the game parameter.

Preferably, the renewable number of times of the play data to be recorded on the recording medium is limited to a prescribed number of times, and the remainder of the renewable number of times is recorded on the recording medium. It is thereby possible to prevent a specific player from monopolizing the use of the game device for a long period of time.

In addition, the settable number of times of the non-player character employing the play data recorded on the recording medium can be limited to a prescribed number of times. It thereby becomes possible to avoid the play data of a specific player from proliferating as the set data of the non-player character.

Preferably, when the game parameter falls under a predetermined condition, a game having the contents or difficulty corresponding to such condition is selected as the second game.

Moreover, the game system of the present invention is a game system comprising: a terminal capable of issuing a recording medium for recording information including the game parameter and displaying such recorded information; and a game device for conducting a game in which a plurality of characters participate including a player character and a partner character (non-player character) upon using the recording medium and renewing the game parameter of the player character recorded on the recording medium, wherein when the game parameter of the player character recorded on the recording medium falls under a predetermined condition, the terminal sets an execution order of a specific game in the recording medium, and the game device reads this recording medium and provides the relevant game.

Preferably, the terminal indicates to the player that a specific game can be played, and sets the execution order when the player shows his/her intention to participate.

According to the foregoing structure, when a prescribed condition is satisfied, the player is recalled to the terminal and, for instance, obtains the right to challenge a personal mission of a different type than the ordinary one-player mode. When the player indicates his/her intention to participate, the participation flag (execution order) of such mission is recorded on the card. When the player inserts this card in the game device, such player may select the special mission.

Moreover, the present invention relates to a program for making a computer system function as the foregoing game device. This is stored in the recording medium of information in a CD-ROM, MO (magnetic optical) recording disk, FD, magnetic tape, ROM, cassette, PCMCIA card, various memory cards (IC cards), portable telephone device, personal digital assistant (PDA), server connected to a network, and so on.

Moreover, the information recording medium having recorded thereon the game program of the present invention makes a computer system function as: battle game execution means for executing a battle game where a player character operated by the player and a partner character (AI robot) controlled with a CPU so as to work in collaboration to battle against an enemy character which moves pursuant to the operation of another player or the control of a CPU; play data generation means for generating play data in accordance with the play contents or play results of the game of the player; AI data generation means for generating a control program of the partner character or setting the control program level based on the play data and making this the AI data of the partner character; and recording means for recording the play data and the AI data on the recording medium capable of recording the play data of the player.

Preferably, the program recorded on the information recording medium further has partner character setting means for setting the parameter for deciding at least one among the performance or appearance of the partner character based on the play data recorded on the recording medium.

Preferably, the parameter character setting means sets the partner character when the play data satisfies a prescribed condition.

Preferably, the prescribed condition is when at least one among the number of times the play data has been recorded on the recording medium, number of times the player played the game, play time, number of times the game has been cleared or has become game over, number of victories or defeats in the game, and score or experiential value obtained during the game play reaches a prescribed value.

Preferably, the program recorded on the information recording medium further has game playable count restriction means for restricting the renewable number of times of the play data to be recorded on the recording medium to a prescribed number of times, and enabling game play until the renewable number of times reaches the prescribed number of times.

Preferably, the recording means records the number of times the play data has been renewed or the remainder of the renewable number of times on the recording medium.

Preferably, the program recorded on the information recording medium further has game play continuance control means for carrying over the play data recorded on the recording means on to a second recording medium when the number of times the play data has been renewed reaches the prescribed number of times, and enabling game play with the second recording medium.

Preferably, the program recorded on the information recording medium further has partner character data recording medium generation means for making the recording medium a partner character data recording medium containing AI data of the partner character when the number of times the play data has been renewed reaches the prescribed number of times; and partner character data renewal means for reading the partner character data from the partner character data recording medium in a prescribed timing such as at the start of a game in the game play or at the start of a stage and making this the partner character data in the game play.

Preferably, the program recorded on the information recording medium further has partner character data recording medium generation count control means for restricting the number of times the partner character data recording medium can be generated to a prescribed number of times.

Preferably, the program recorded on the information recording medium further has game selection means for deploying a second game different from the game when the play data satisfies the prescribed condition.

Preferably, the number of times the partner character data recording medium can be generated is changed in accordance with the play results of the second game.

Preferably, the program recorded on the information recording medium further has deployment time frame control means for deploying the second game in a prescribed time frame.

Preferably, the recording means further records at least one among the execution of the second game, number of executions, success or failure, and number of times of success or failure.

Preferably, the recording medium includes at least one among a magnetic card, IC card, IC memory, PCMCIA card, portable telephone device, and network server.

Moreover, the video game device of the present invention mounts an information recording medium having recorded thereon the foregoing game program.

Moreover, the video game of the present invention is a video game device for executing a battle game where a player character operated based on the operational signal from the operation means operated by the player and a partner character (AI robot) controlled with a CPU so as to work in collaboration to battle against an enemy character which moves pursuant to the operation of another player or the control of a CPU, the video game device comprising: play data generation means for generating play data in accordance with the play contents or play results of the game of the player; AI data generation means for generating an AI program or an AI level of the partner character and making this the AI data based on the play data; and recording means for recording the play data and the AI data on a recording medium.

BRIEF DESCRIPTION OF THE DRAWINGS

The objects and advantages of the present invention will be more sufficiently understood from the ensuing detailed description and reference to the drawings.

FIG. 9 is an explanatory diagram explaining the shooting attack and shooting defense of the game parameter;

FIG. 10 is an explanatory diagram explaining the proximal attack and proximal defense of the game parameter;

FIG. 11 is an explanatory diagram explaining the thinking clock and tag team aptitude of the game parameter;

FIG. 17 is an explanatory diagram explaining an example of the occurrence condition of a special mission;

FIG. 22 is an explanatory diagram showing an example of the time limit screen of the set game.

DESCRIPTION OF THE PREFERRED EMBODIMENTS

Embodiments of the present invention are now explained with reference to the drawings.

Figure 1:
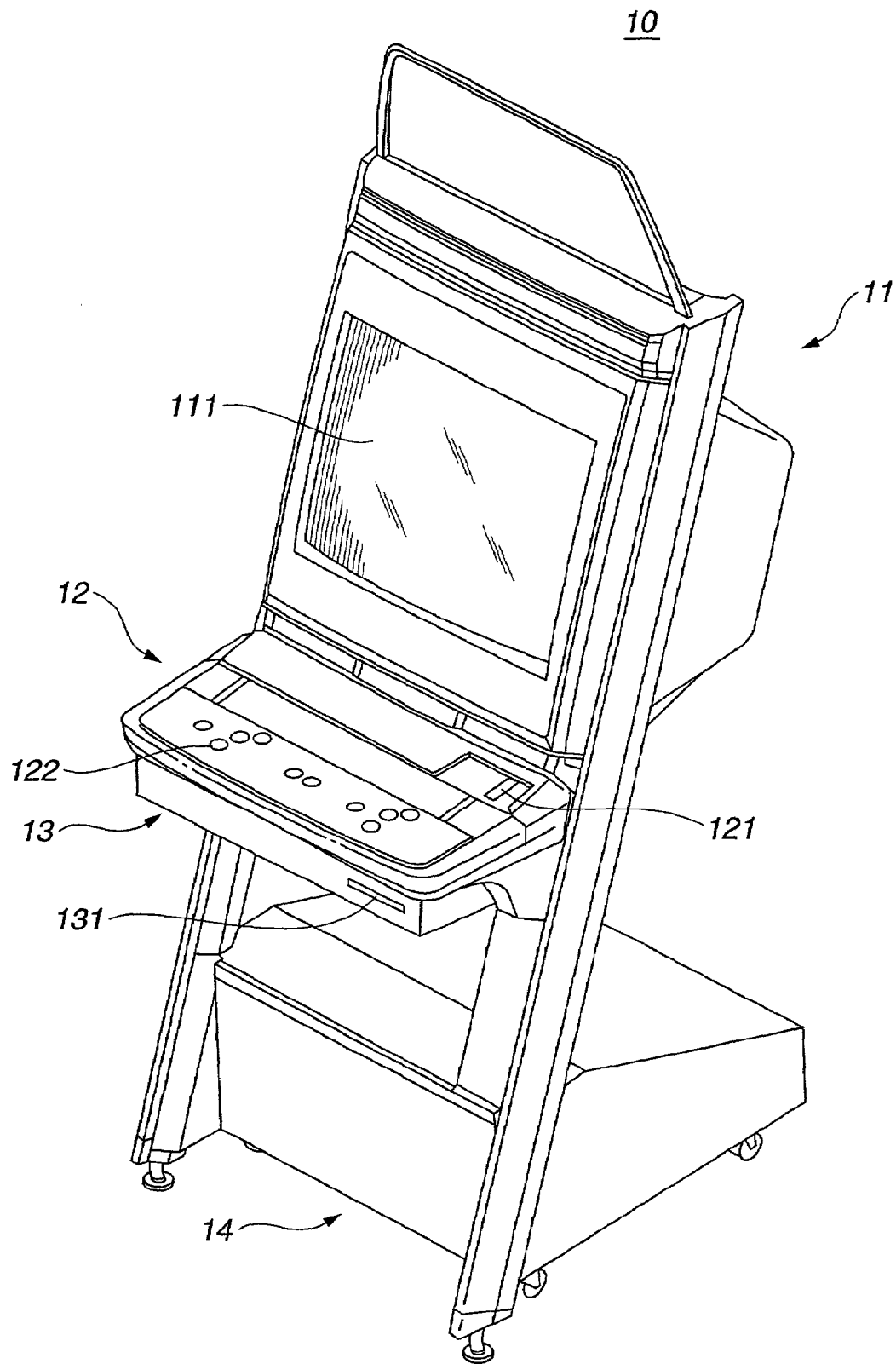
FIG. 1 is a perspective view explaining the terminal to become the command center for issuing cards, renewing cards and ordering missions.
Figure 2:
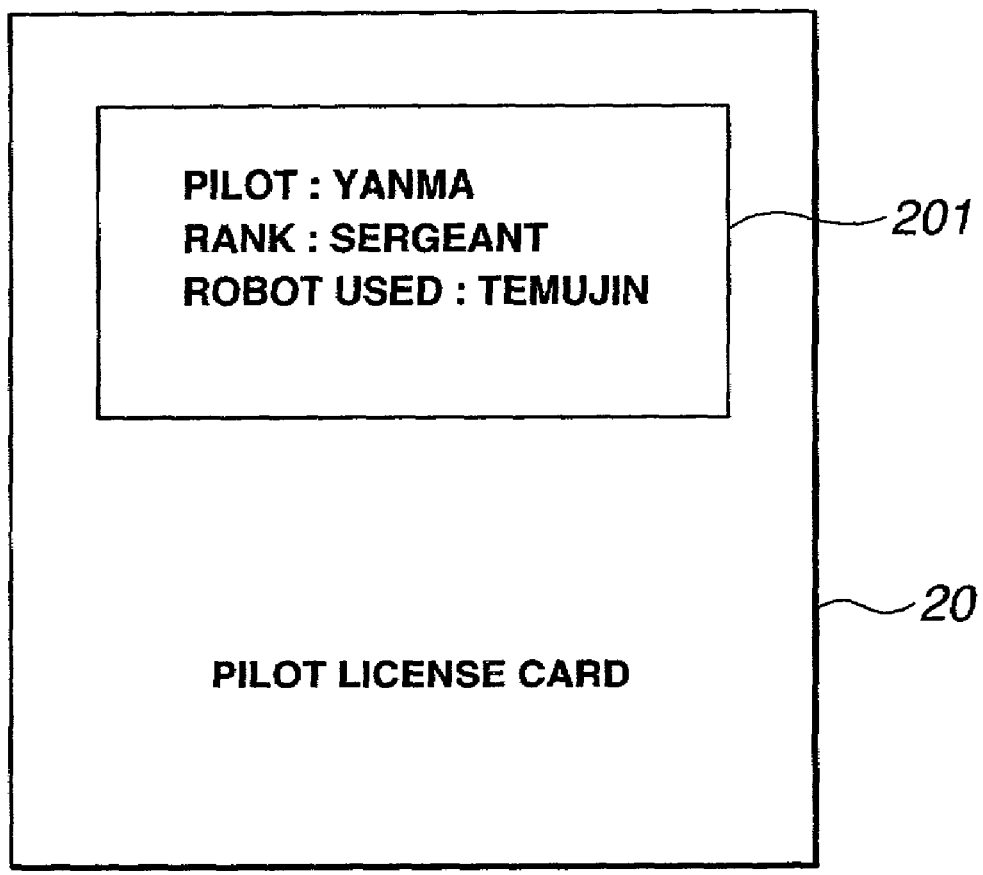
FIG. 2 is an explanatory diagram explaining an example of a card storing data such as the game parameter.
Figure 3:
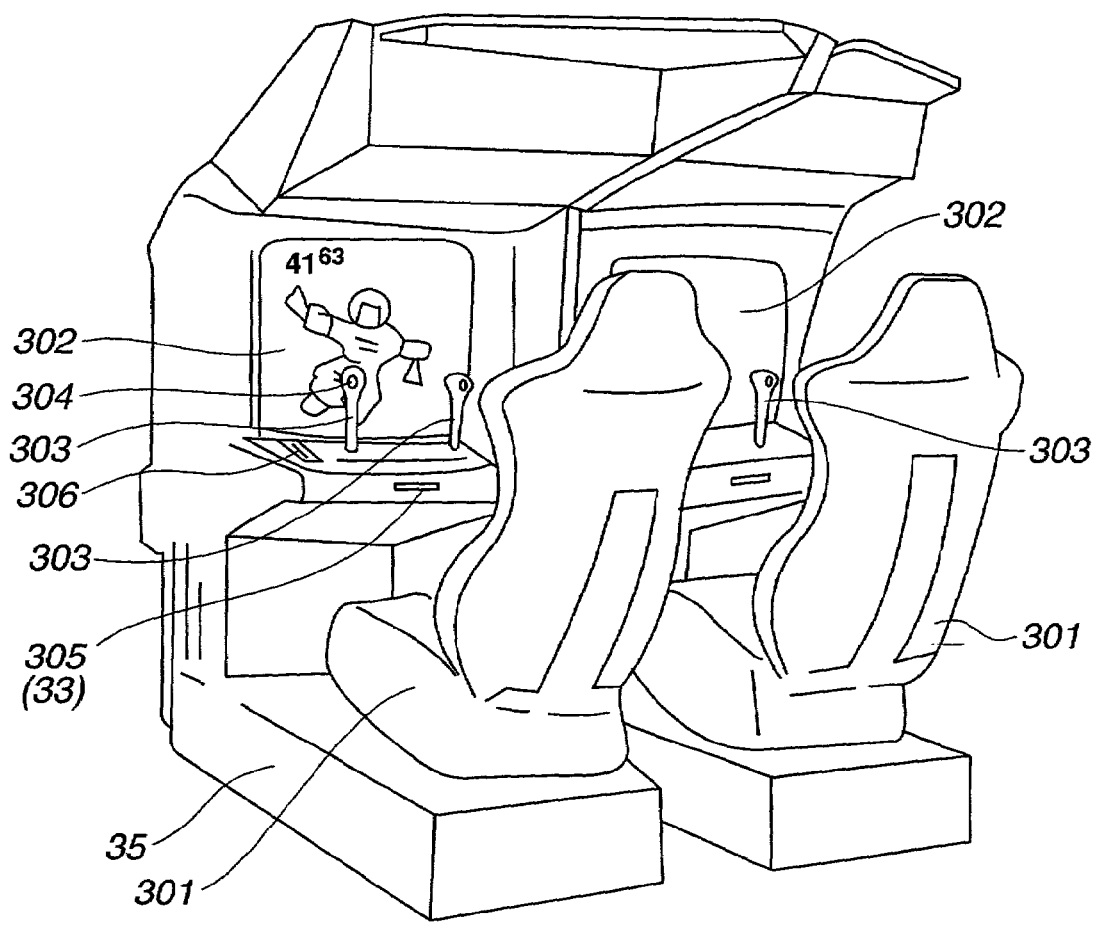
FIG. 3 is a perspective view explaining the twin game device.

FIG. 1 to FIG. 3 are explanatory diagrams for explaining the video game system according to the present invention. This video game system is for conducting a so-called battle game wherein a plurality of players participate in the game. Preferably, one or two twin game devices are provided, and two or four persons play the game. Since these are communication game devices, game devices may be added for game play with more people.

Although a magnetic card is used as the information recording medium in a game, other items, such an IC card for example, may be used, and the recording medium is not limited to a magnetic card.

FIG. 1 shows a terminal (terminal device) 10 for issuing cards or the like. The terminal 10 plays the role of issuing cards, conducting continuity procedures of card data, enabling the perusal of internal card information, promoting and demoting the player (pilot), awarding a new battle robot, and so forth. The terminal 10 comprises a display unit 11 formed of a CRT, LCD, or the like; an input operation device 12 having various switches such as a keyboard switch; a card device 13 for issuing cards, reading and writing card data, etc.; and a control unit 14 described later having a control circuit for controlling the terminal operation. Various types of guidance relating to the issuance of cards, a virtual keyboard for inputting data, display of the card contents, and various displays for functioning as a virtual command center described later are displayed on the screen 111 of the display unit 11. The input operation device 12 is used for inputting various data such as the name of the player, selecting the game stage, responding to the terminal 10, and so on. Moreover, a coin insertion slot 121 is provided to the input operation device 12. The coin may be hard money or a game token or the like. The card device 13 reads the information recording card 20 described later and inserted into the card slot 131, renews the data, and discharges such card. Further, unused cards are accumulated in a built-in tray and a new card 20 is issued in correspondence with the purchase of the player.

FIG. 2 shows the card 20, which is preferably a thin magnetic recording card, but it may also be an IC card or other recording media, and may also be in a disk shape. A renewable display area 201 to which information and guidance are printed is formed on the card 20. Displayed for example are the name of the player (pilot), rank, name of the character used, and so forth.

FIG. 3 shows the video game device 30. Although two video game devices 30 are combined to form a twin device in this example, as described above, this may be formed of a plurality of devices; four devices for example. The video game device 30 offers a battle play, one-player play, practice play, "occurrence of emergency contact", and the like.

Each video game device comprises a seat 301 for the player to sit, a display unit 302 for displaying on the screen the game deployment scene in the virtual game space, an operation lever 303 and a trigger switch 304, a card insertion slot 305, a coin insertion slot 306, a control device 35, and so on. Each video game device is connected with a communication circuit and structured favorably to conduct a battle game.

Figure 4:
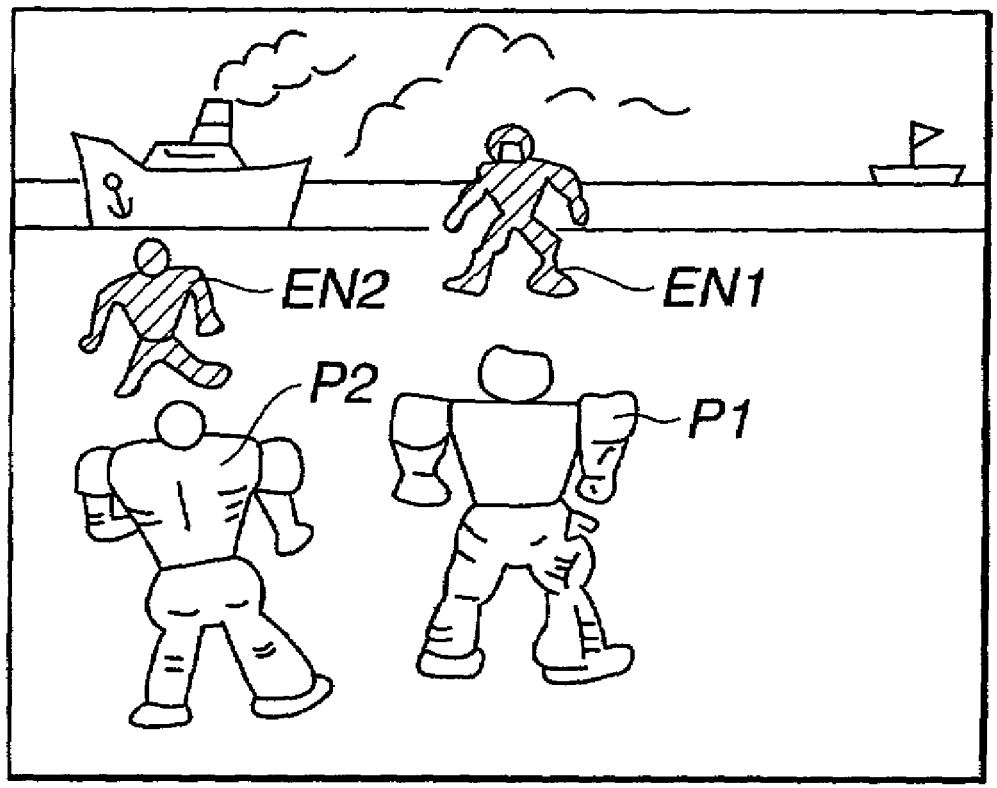
FIG. 4 is an explanatory diagram explaining a two-on-two battle game.
Figure 23:
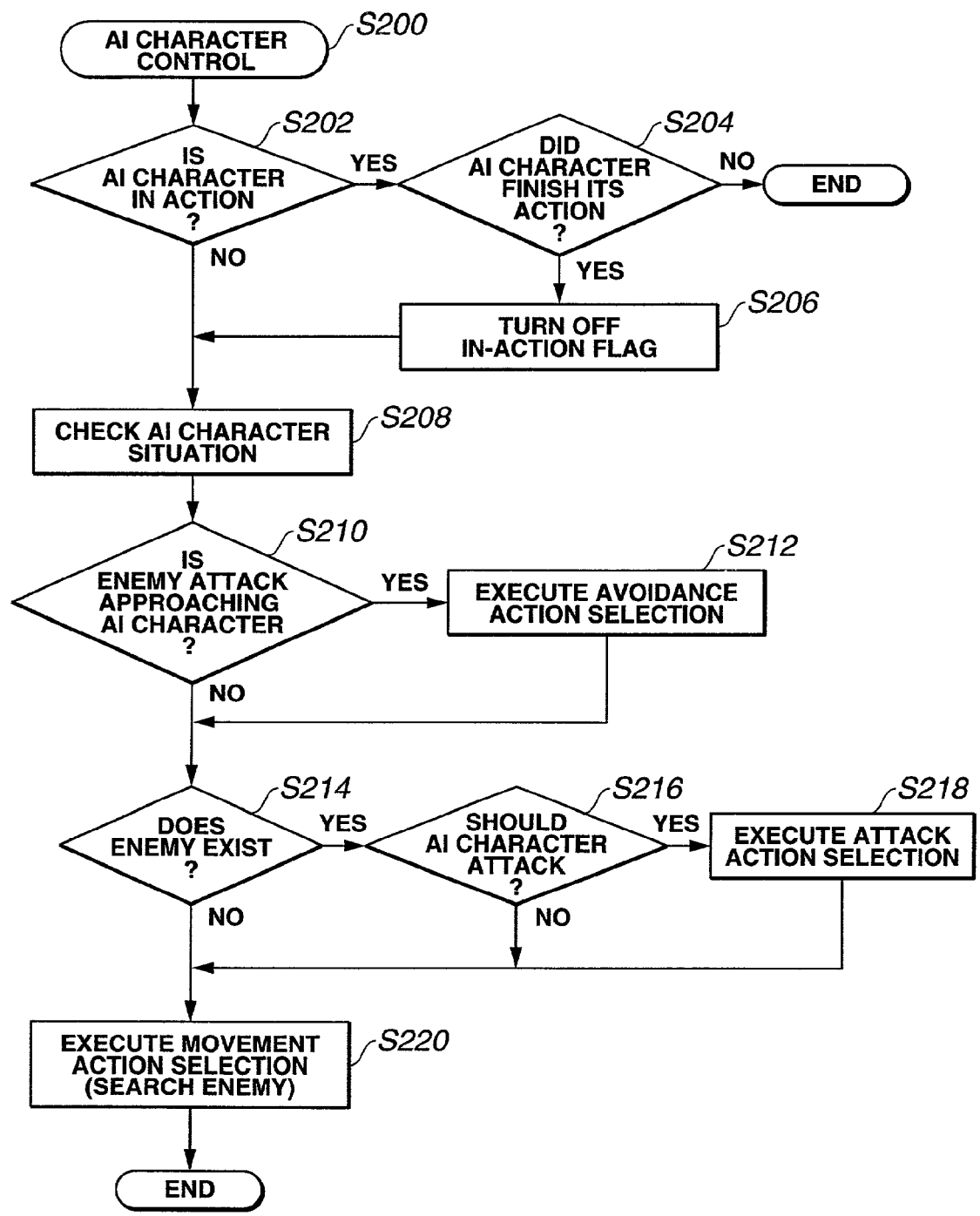
FIG. 23 is a flowchart explaining an operational example of an AI character.

FIG. 4 shows a display example of the battle game screen on the display unit 302. This diagram shows a scene where a character (player character) P1 operated by the player and a partner character (non-player character) P2 operated by another player or a computer's artificial intelligence (a type of program) battling within a three dimensional game space with enemy characters EN1, EN2 operated by an opponent player or the computer's artificial intelligence viewed from the viewpoint of a suitable virtual camera position. Operational examples of the partner character and enemy character (AI characters) operated by the computer's artificial intelligence (AI) will be explained later (FIG. 23).

Figure 5:
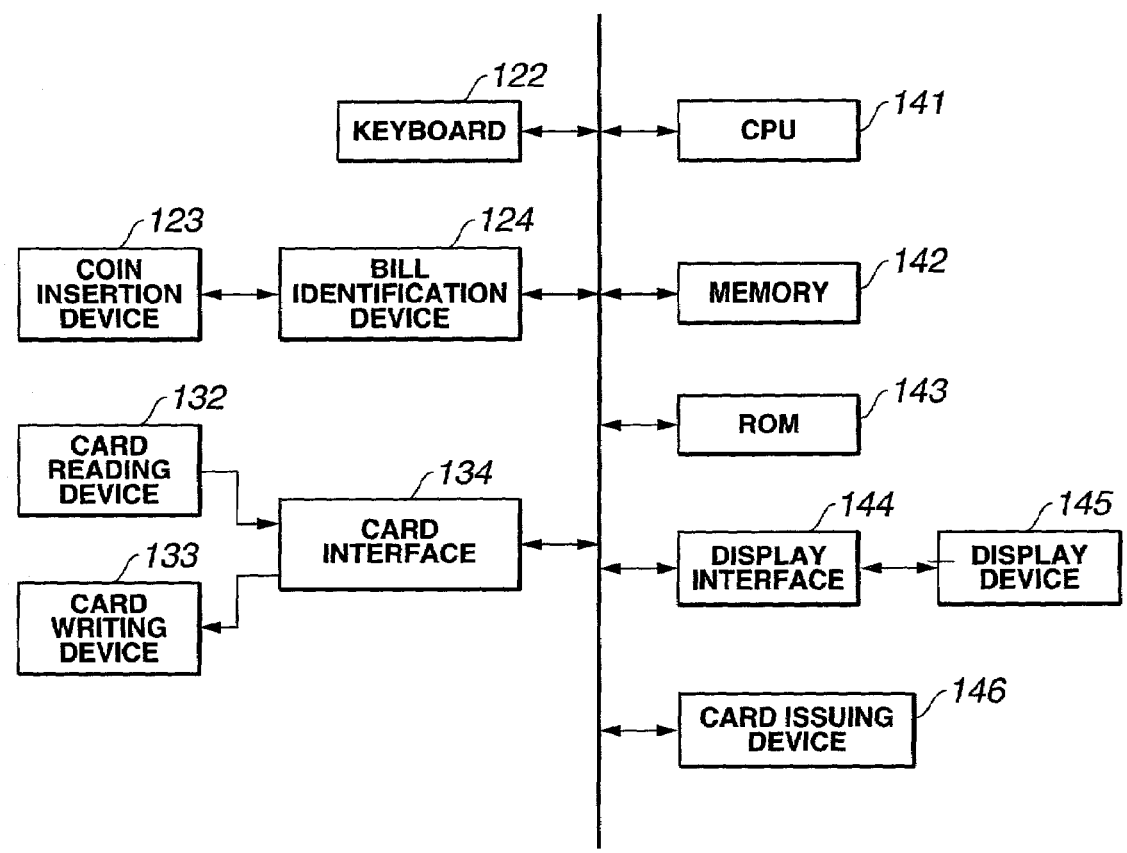
FIG. 5 is a block diagram explaining the terminal control system.

FIG. 5 is a block diagram for explaining the control system of the terminal 10. As described above, the input operation device 12 and card device 13 are connected to the control unit 14. The CPU 141 introduces and executes the program stored and retained in the ROM 143 into the program area of the memory 142, reads the prescribed area of the various data memories 142, and performs processing corresponding to the request of each unit. Such contents are displayed on a display device 145 such as a CRT via a display interface 144 for performing the processing to display images. Output from the switches 122 such as a keyboard of the input operation device 12 is written in a prescribed area of the memory 142 with DMA operation, or subject to flag setting processing, and processed with the CPU 141. Output from the coin insertion device 123 for controlling the acceptance and payout of coins inserted by the player, and output from the identification device 124 for identifying the genuineness of the coin and the inserted amount area also processed with DMA operation. When the player inserts the card 20 into the card slot 131, the card reading device 132 built in the card device 13 reads the recorded data. The read data is stored in a prescribed area of the memory 142 via the card interface 134. Moreover, the card interface 134 sends the data output from the memory 142 to the card writing device 133 in order to renew the recorded data of the card 20. The card issuing device houses new cards, and sends such new card to the card writing device to write prescribed data, and then issues such card.

Figure 6:
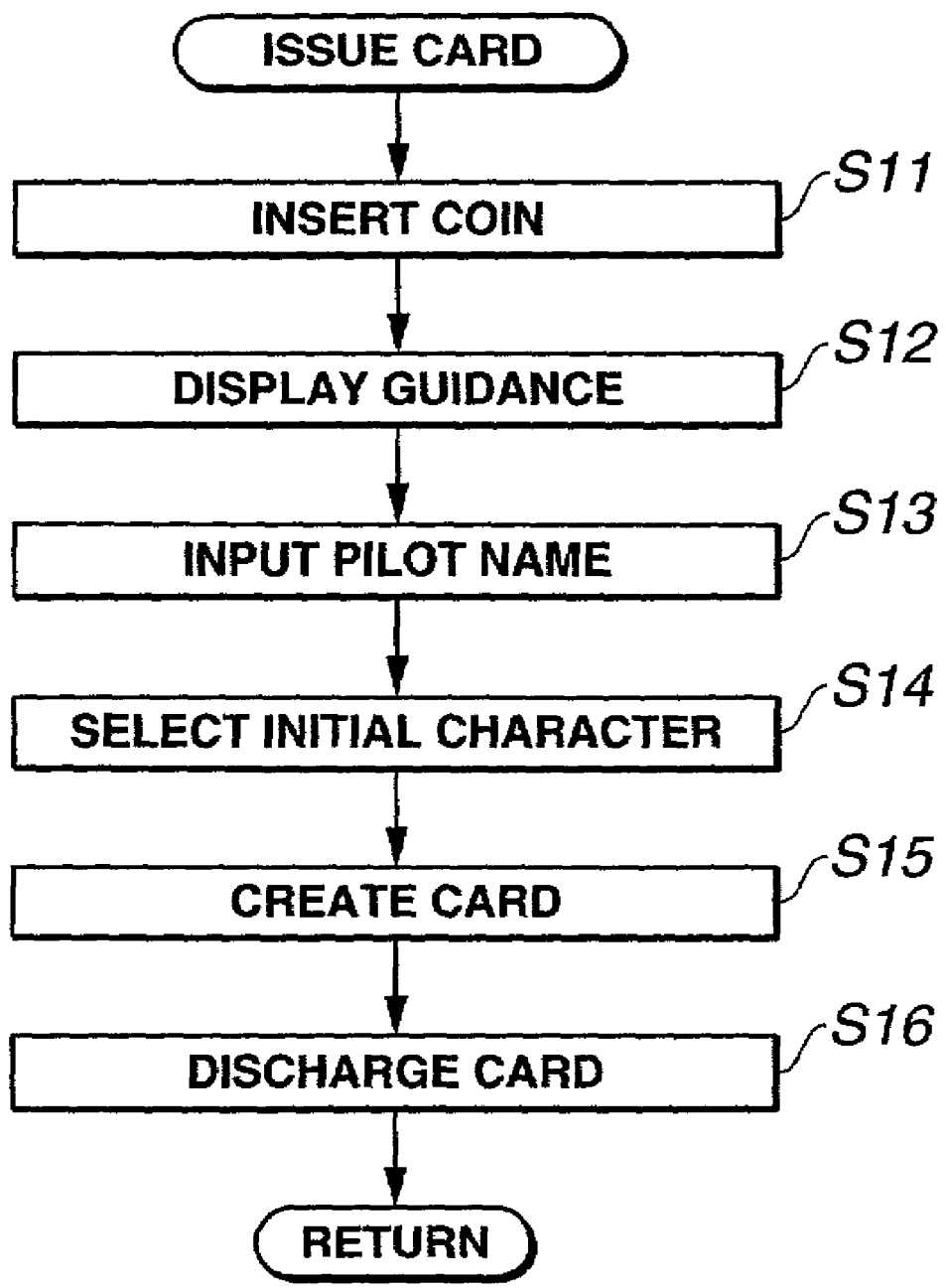
FIG. 6 is a flowchart explaining the card issuance procedure with the terminal.

FIG. 6 is a flowchart for explaining the issuance procedures of the new card. When the player inserts a coin into the insertion slot 12 in accordance with the guidance displayed on the screen 11 of the terminal 10, the coin is identified, and the CPU 141 determines that a prescribed coin has been inserted (S11). The CPU 141 guides the procedures for issuing a new card (S12). The player operates the switches 14, or uses the virtual keyboard or the like displayed on the screen to input one's name (S13), and selects the first character (robot) to be used among the plurality of combat characters in accordance with the guidance (S14). The CPU 14 determines, for example, that a player playing for the first time is a buck private, and, as described later, determines the relevant rank when the player's past play data is to be reflected. And, as shown in FIG. 2, the CPU 14 records the pilot's name, rank, and type of character used on the card (S15), prints this on the printing area on the outer face of the card, and further discharges this from the card input/output slot 13 (S16).

Figure 7:
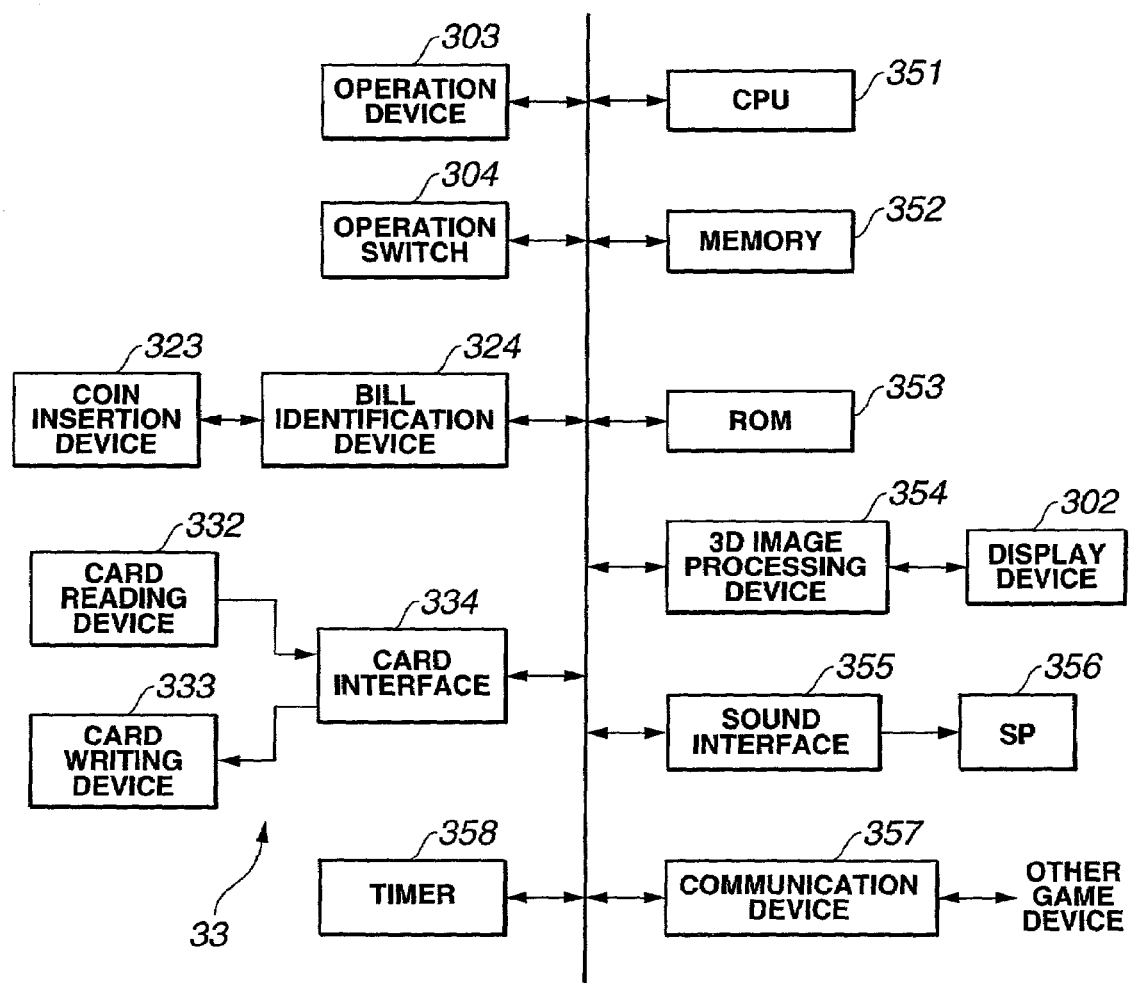
FIG. 7 is an explanatory diagram explaining the game device control system of one device worth of the twin game device.

FIG. 7 is a block diagram showing a structural example of the control system of a single video game device 30. Connected to the control unit 35 are the aforementioned operation device 303, operation switch 304, coin insertion device 323, and coin identification device 324. Moreover, the card device 33 structured from the card reading device 332, card writing device 333 and card interface 334 is also connected thereto. The CPU 351 is connected to a plurality of CPUs, and introduces and executes the program stored and retained in the ROM 143 into the program area of the memory 142, reads the prescribed area of the various data memories 142, and performs processing corresponding to the request of each unit. It also executes other applications. The appearance of the virtual space of the game deployed by the character is imaged with a three dimensional image processing device 354, and displayed on the image display device 302 of a CRT or the like. Output from the operation device 303 or operation switches 304 is written in a prescribed area of the memory 352 with DMA operation, or subject to flag setting processing, and processed with the CPU 352.

Similar to the terminal 10, output from the coin insertion device 123 for controlling the acceptance and payout of coins inserted by the player, and output from the identification device 124 for identifying the genuineness of the coin and the inserted amount area also processed with DMA operation.

When the player inserts the card 20 into the card slot 305, the card reading device 332 built in the card device 33 reads the recorded data. The read data is stored in a prescribed area of the memory 352 via the card interface 334. Moreover, the card interface 334 sends the data output from the memory 352 to the card writing device 333 in order to renew the recorded data of the card 20.

The communication device 357 exchanges (communicates) data online with the other game devices in order to conduct a battle game. Moreover, the timer device 358 has a computer clock function. This is used for setting the operation mode of the game device to a different mode in a time frame as described later.

Figure 8:
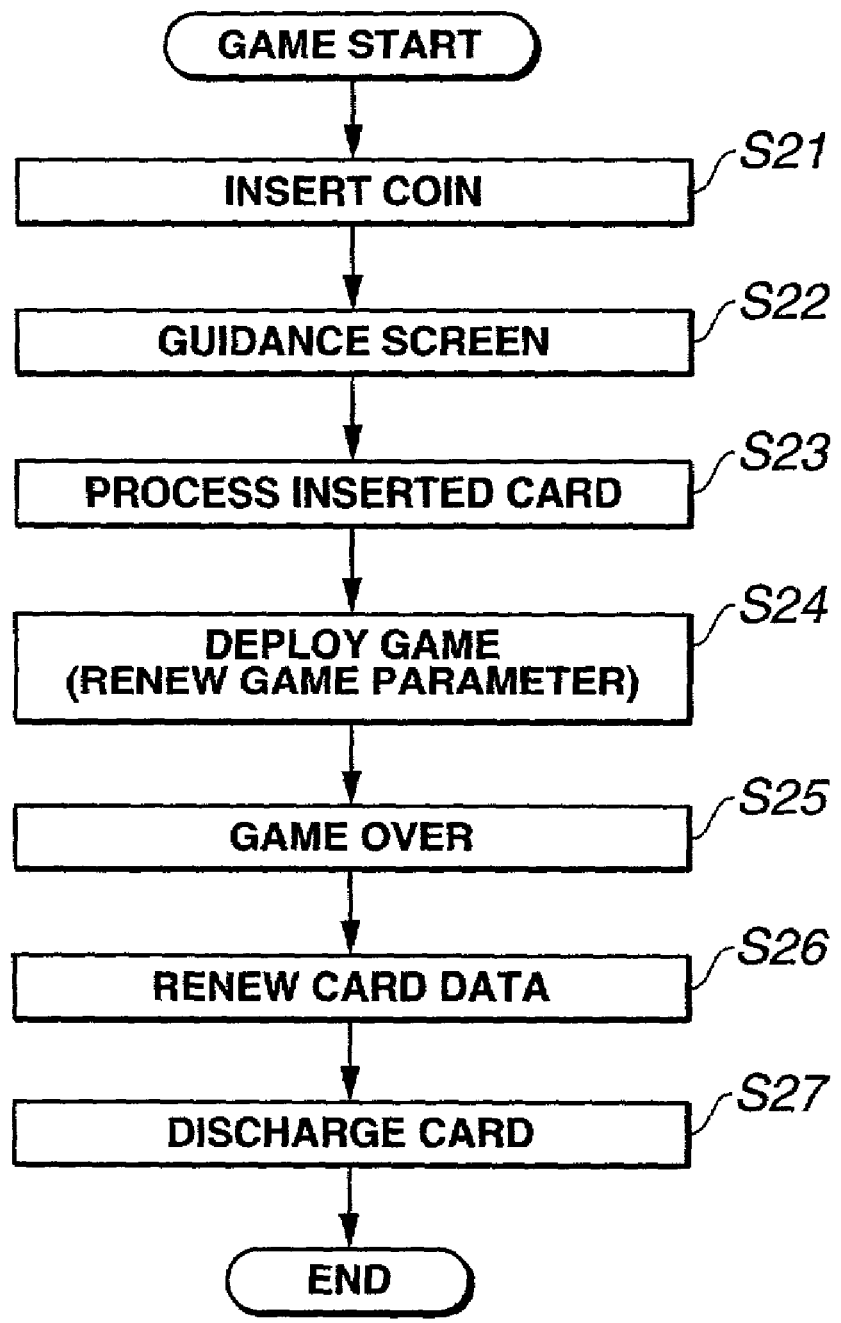
FIG. 8 is a flowchart explaining the operational procedure employing a card of the twin game device.

FIG. 8 is a flowchart for explaining the flow of the ordinary game in the battle game device 30. As described later, a supplementary mode is added or changed for some of the steps.

When a player inserts a coin, the CPU 351 identifies this (S21), displays a game guidance screen, and urges the player to insert a card (S22). When the player inserts a card newly purchased from the terminal 10, the CPU 351 reads the card contents, makes the character indicated on the card appear, and makes this the character to be used by the player. The pilot's name, rank, and character name are displayed on the screen. In the example shown in FIG. 2, "YANMA" (name), "Sergeant" (rank) and "Temujin" (character name) are displayed on a part of the screen. Incidentally, when the player is playing this game for the first time, he/she will be a "candidate" or the like, for example (S23). Next, the CPU 351 moves the screen to the game space, and advances the battle in accordance with the game program. During this battle, the game parameter of the character operated by the player is renewed.

FIG. 9 to FIG. 11 are diagrams showing examples of the game parameter of the player. As the parameter types, there are "shooting attack", "shooting defense", "proximal attack", "proximal defense", "thinking clock", "tag team aptitude" and the like, but the parameter is not limited to the above. "Shooting attack", for instance, is an experiential value obtained by dividing, by 100, the damage value of the two enemy robot when shot from the player character. When this experiential value reaches a prescribed experiential value and a prescribed level up condition is cleared, the level LV value will increase. The level LV value is set in stages from 1 to 15. For example, with the LV value at "1", this is subject to a condition where three types of attacks using a left operation lever (L), a right operation lever (R), and both operation levers (B) within a single game set. This is the same with other parameters as well. The respective parameter values change in accordance with the results during the game deployment (S24).

When the CPU 351 determines that the game is over (S25), the game parameter is written in the card to renew the parameter. Moreover, one is deducted from the possible number of game sorties recorded on the card (initial value of 30 for example) (S26).

In addition to the LV level of the foregoing "shooting attack" (15 stages) and experiential value, the parameter includes the appropriate distance of combat (initial value is 200 for example), as well as the AI card issuance number, AI battery and so on described later. The AI issuance remainder number shows the number of AI cards that can be issued. The AI battery shows the possible number of sorties usable as the AI card. For example, the initial value of the AI battery is 250. When a partner character operated by a computer with artificial intelligence (AI) is selected as the battle game partner, the AI card reflects the game parameter recorded on the AI card obtained by the player in the AI. As described later, when a card can no longer be used since the battle sortie has exceeded a prescribed number of times, such card may be used as the AI card.

In addition, although the AI card is able to use the game parameter indicated on the card obtained by the player in the partner character as is, a single AI level corresponding to the game parameter obtained by the player may be recorded on the AI card and this may be used to control the AI character. This is convenient when the card has a small storage capacity.

Further, as described later, when using a large capacity IC card or the internal memory (including IC cards) of portable telephone devices, or an online database via the portable telephone device as the AI card (recording medium), in addition to the game parameter of the partner character, the AI program itself of the partner character may also be recorded thereon.

When the CPU 351 renews the card data, it discharges the card outside the machine (S27). The game employing the card is thereby finished. Moreover, as described later, there are cases where a special message such as "emergency contact" is displayed during the renewal of the card data (S26).

Figure 12:
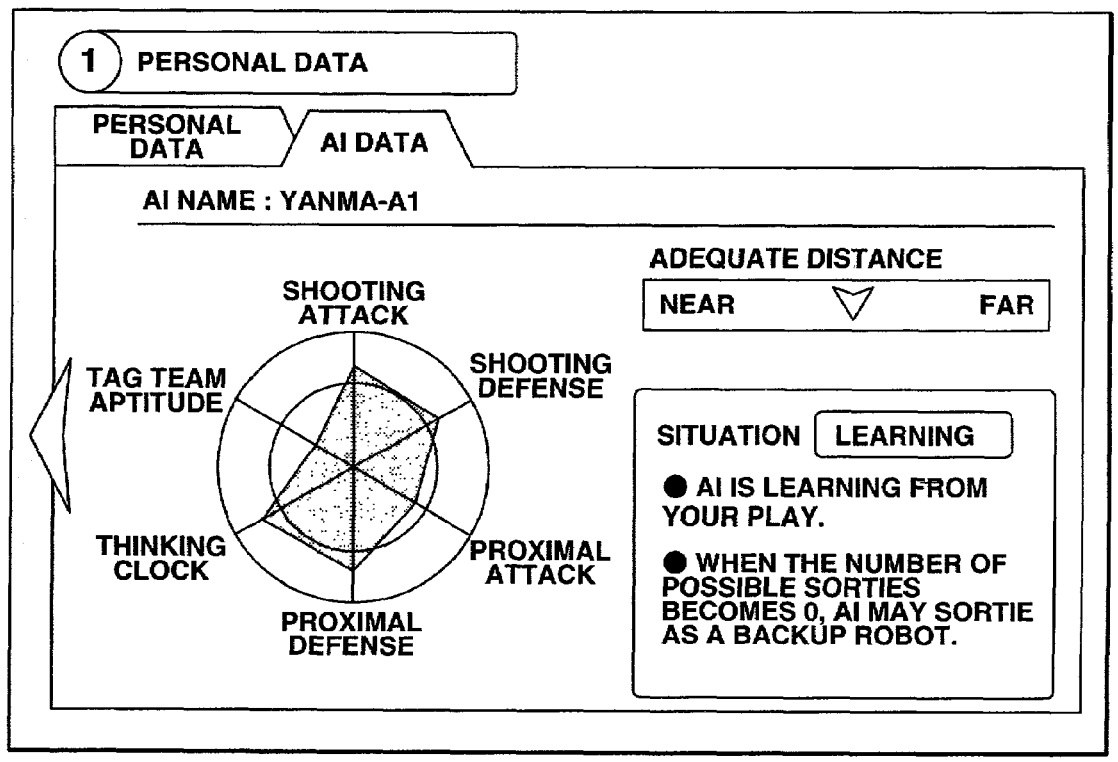
FIG. 12 is an explanatory diagram explaining an example displaying data stored in the card with the terminal.

FIG. 12 shows an example of the terminal 10 indicating the perusal display of the card contents of the player. When the player selects personal data display from the guidance screen of the terminal 10 and inserts the card, the game parameter condition such as the shooting attack is shown with a circular graph. The adequate distance parameter showing the distance of the battle is shown in a bar graph.

Figure 13A:
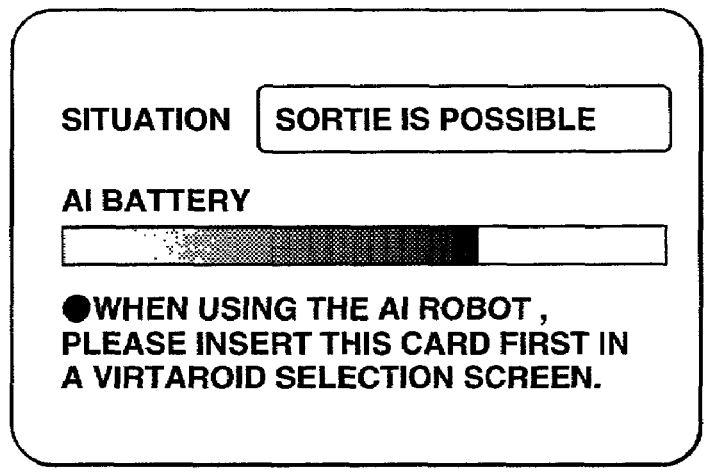
FIG. 13 is an explanatory diagram explaining whether it is possible to create an AI operational partner character card with the AI data accumulated during one's game play.
Figure 13B:
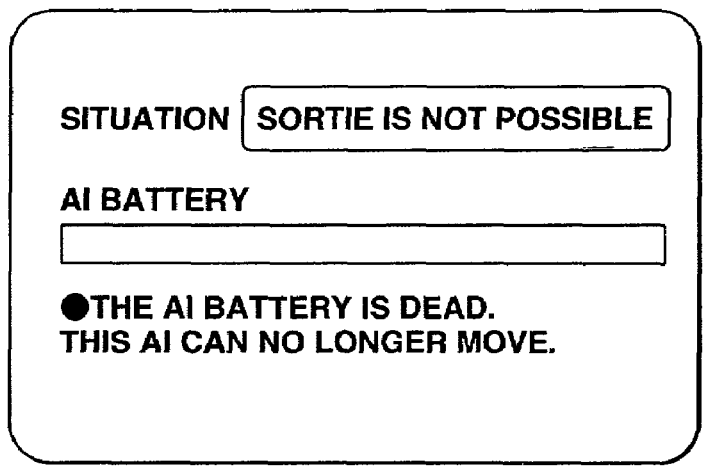

In FIG. 13(a), the condition display of the perusal display is displaying the possibility of partner character sorties (possible number of sorties) with the AI card data. There is remaining AI battery, and "sortie is possible" is displayed on the situation column. FIG. 13(b) is displaying that the possible number of partner character sorties has ended with the AI Card data. There is no remaining AI battery, and "sortie is not possible" is displayed on the situation column. When card discharge is selected from the screen menu (not shown), the card is discharged outside the terminal 10.

Figure 14:
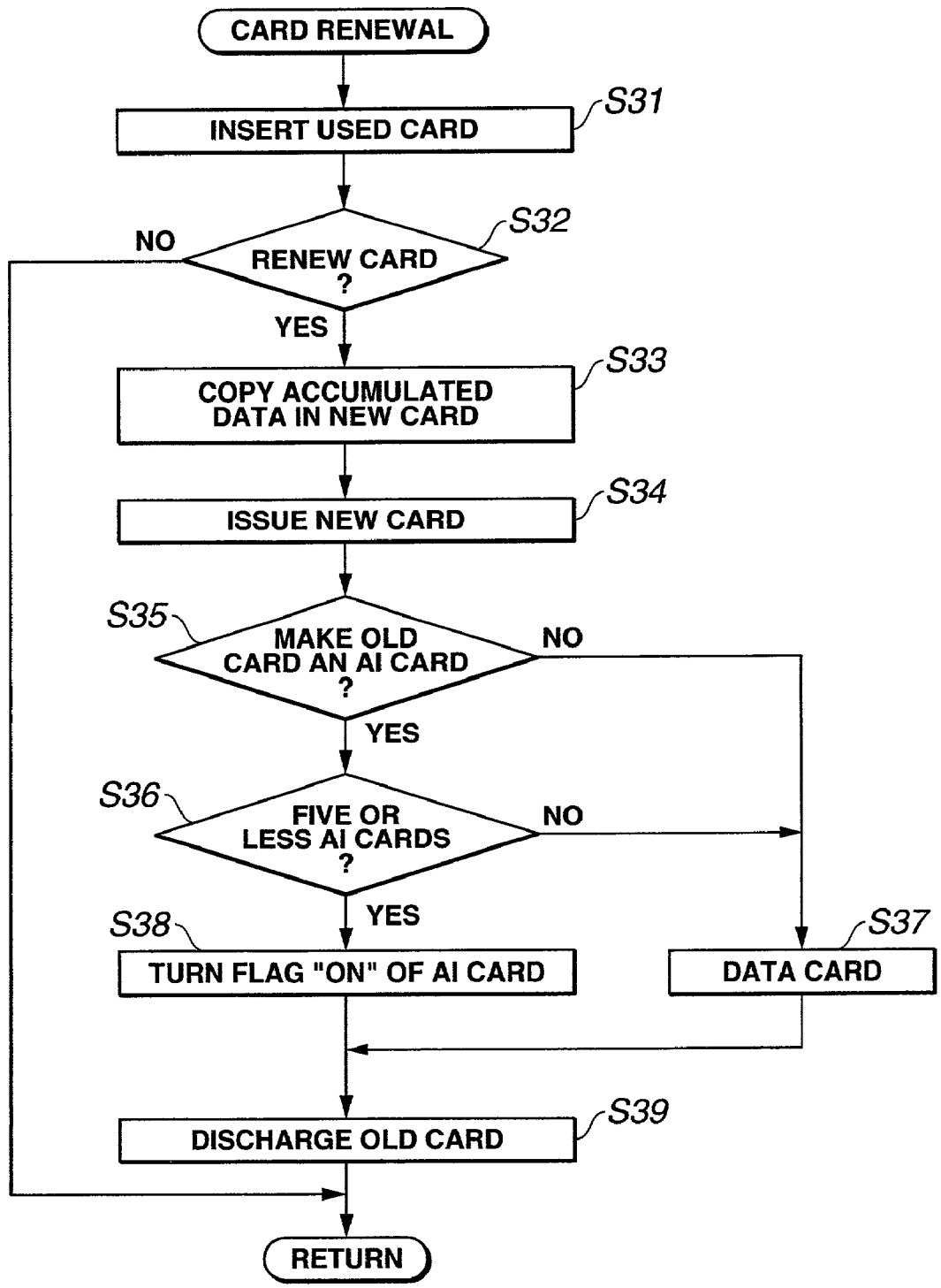
FIG. 14 is a flowchart explaining the card renewal procedure in the terminal.

FIG. 14 is a flowchart for explaining the card renewal in the terminal 10. As described later (FIG. 15), a prescribed number, for example, the possible sortie count parameter capable of making 30 sorties in a battle (i.e.; 30 games can be played) is set in the card. When making one sortie and the game is over, one is subtracted from the remaining number of possible sorties. Regardless of the victory or defeat, when the battle is finished, the sortie count is decreased. When the remaining sortie becomes "0", a battle can no longer be conducted with this card. Thus, conventionally, a player was able to continue playing numerous games with the initially inserted coin so as long as such player kept winning, and, contrarily, a beginner who kept losing had to continue paying coins. Nevertheless, with this game system, a player who continues playing the game while sitting will have to renew the card at a faster timing. Meanwhile, a player who loses and leaves the seat quickly may play the game for a long time with a single card. Thereby, the game burden is made equitable.

As described above, when playing the game using a card, "−1" is calculated with a one-player game and "−1" is calculated with a battle game with respect to the possible number of sorties (possible number of game play). When the remainder becomes "0", that card may no longer be used to play the game. Thus, it is necessary for the player to purchase a new card and make a sortie in the combat. Here, the player transfers the game parameter of the used card to the newly purchased card, and is thereby able to continuously seek the improvement in the level of the game parameter. Moreover, the used card in which the possible number of sorties has become 0 may be used as an AI card. The AI card may set the game parameter of the comrade partner character operated by the computer to the player's game parameter during a one-player game.

In the terminal 10, when the player inserts a used card, the CPU 141 reads the card data, identifies that the possible number of sorties is 0, and displays the guidance for renewing the card (S31). When the player inserts a coin for purchasing a new card, the CPU 141 determines whether the card renewal has been selected or not (S32). When not selected, this mode is ended (S32; No). When selected (S32; Yes), recorded data such as the name, rank and game parameter read from the used card is written in the new card (S33). The card with data recorded thereon is discharged, and such card is issued (S34). Thereby, a new card having a prescribed number of possible sorties is obtained.

The CPU 141 displays guidance regarding whether the used card should become an AI card. When the player selects an AI card (S35; Yes), the CPU 141 determines whether the number of AI cards which have been issued to this player is 5 cards or less (S35). This is conducted by setting "5" as the parameter of "AI card issuance number" upon issuing cards to a new pilot, thereafter subtracting "1" each time an AI card is issued, and succeeding such data upon renewal. When the AI card issuance number is 5 or less (S36; Yes), writing is conducted so as to turn on the column of the AI card flag of the used card (S38). The card is thereafter discharged outside (S39).

Moreover, when the used card is not selected to be used as the AI card (S35; No), flag writing for the data card setting is conducted so as to be used as a data card capable of only reading and displaying the indicated data (S37), and the card is discharged thereafter (S39). When AI card issuance number is more than 5 cards for the player (pilot) (S36; No), the used card is made to function only as a data card, and this card is thereafter discharged outside the machine (S37, S39).

As described above, the used card is used as an AI card or a data card. By limiting the number of cards that may be made into an AI card, it is possible to prevent other users from using an AI card of a player having a particularly high skill level.

Figure 15:
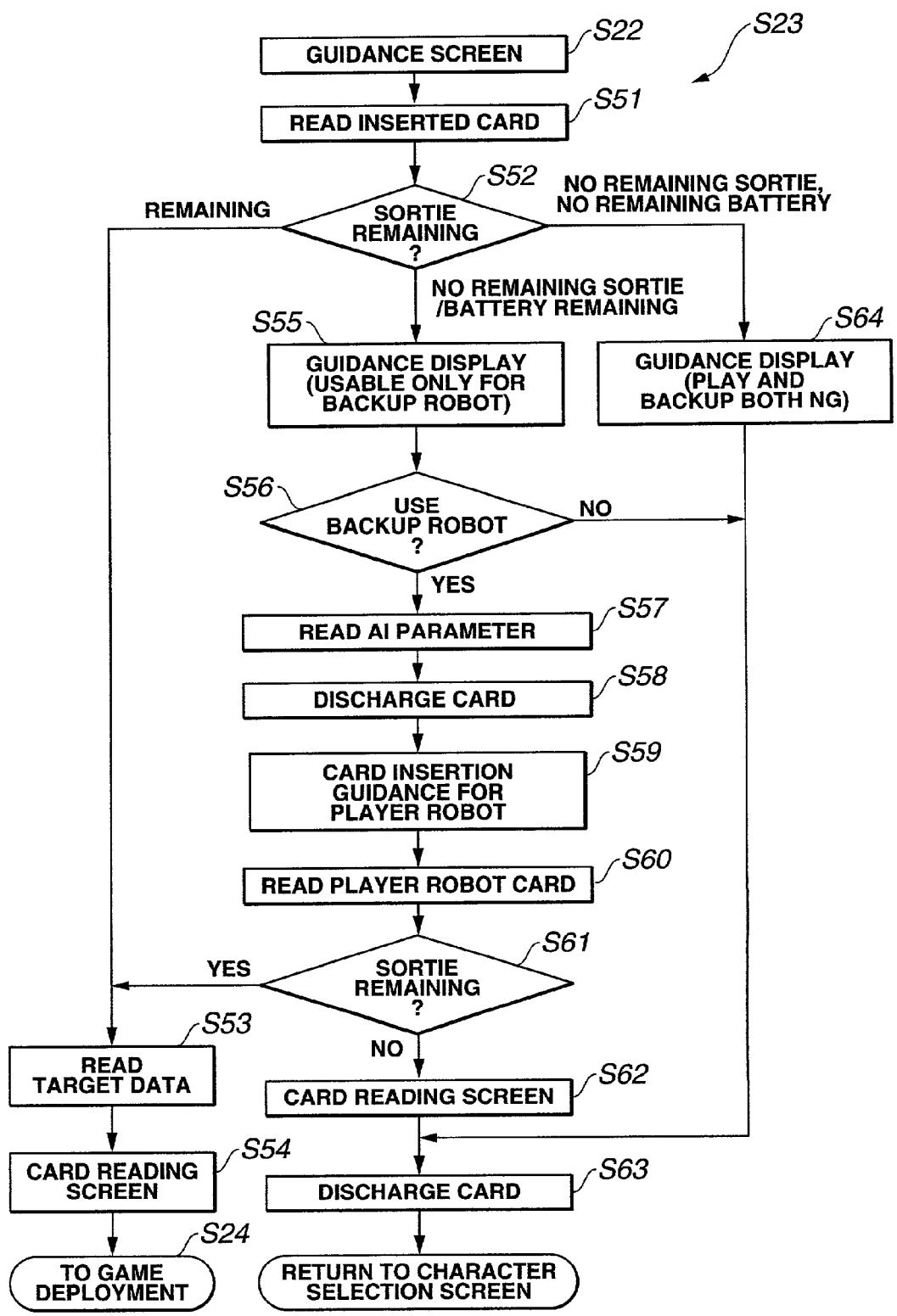
FIG. 15 is a flowchart explaining an example of a card play in the twin game device.

FIG. 15 is a flowchart for explaining the data reading procedures from the card in the game device. In FIG. 15, steps 22 to 24 illustrated in FIG. 8 are explained in detail.

After a coin is inserted and a card is to be used, the CPU 351 displays on the character selection guidance screen a guide to insert the card in the slot 305 (S22). When the player inserts the card into the slot, the possible number of sorties and the AI battery value recorded on the card are read out. When this is an AI card, the possible number of sorties is "0" (S51).

Figure 16:
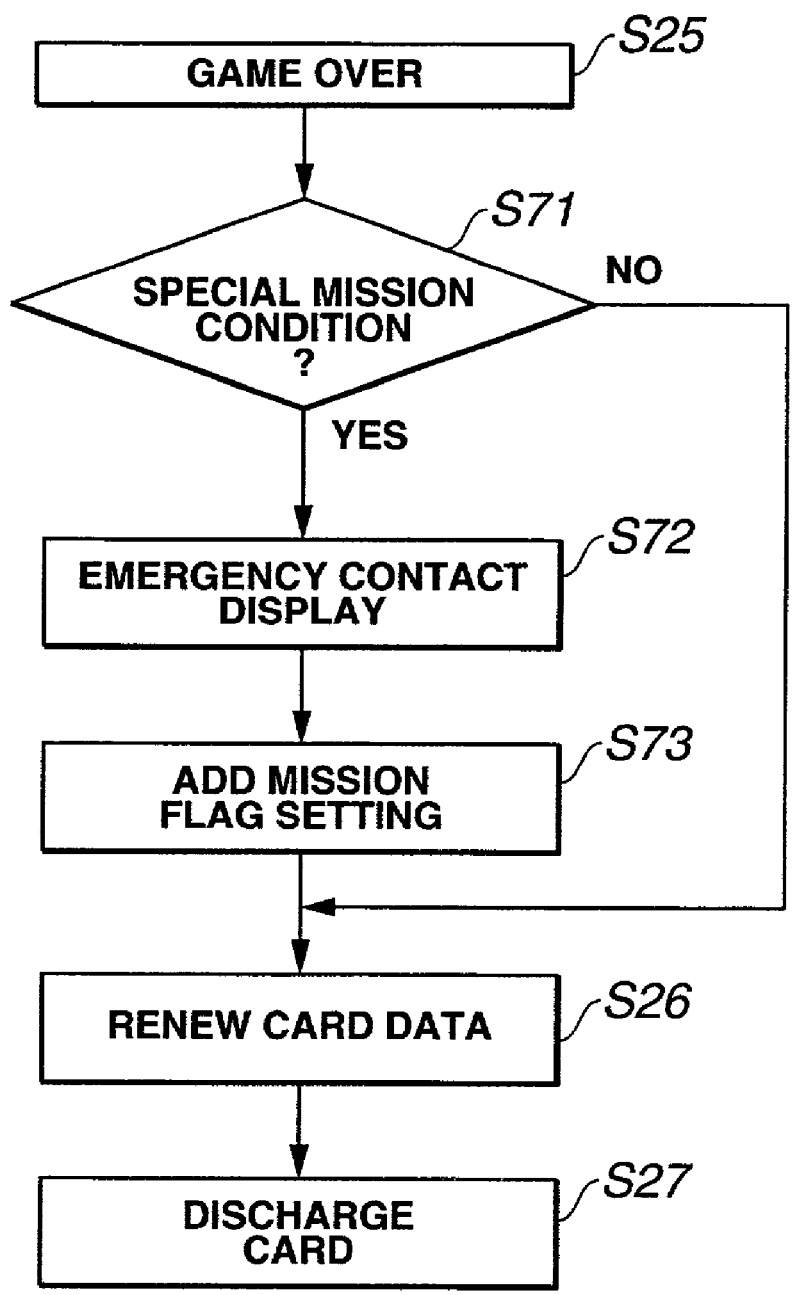
FIG. 16 is an explanatory diagram explaining the condition satisfaction of a special mission.

When the possible number of sorties still remains (S52; Remaining), the CPU 351 reads data such as the game parameter of the player character from the card. This data is set as the performance parameter of the character (S53). An indication of "Reading of player character's robot data complete" is displayed (S54), and the routine proceeds to the game deployment described above (S24). Thereafter, the game parameter recorded on the card is renewed upon ending the game (FIG. 16, S26). Thus, the aforementioned possible number of sorties (possible number of game play) corresponds to the possible number of renewals of the game parameter (play data) recorded on the card (recording medium), and the possible number of sorties recorded on the card is subtracted by one each time a game is played. As described above, the possible number of sorties is initially set to 30 times for example.

In the case of "No remainder (of possible number of sorties), AI battery remaining" (S52; Not remaining, this card may be used as an AI card. The CPU 35 shows a guidance display indicating that the card may only be used as the game parameter of the backup robot (partner character to be operated by the computer) of the player (S55). When the player selects not to use the backup robot (S56; No), the CPU 351 discharges the card (S63). When the player selects to use the backup robot (S56; Yes), the CPU 351 reads the AI game parameter and the like (S57), and discharges this AI card (S58). The game data read from this AI card is set as the game parameter of the partner character. Step 57 corresponds to the non-player character setting means.

Next, the CPU 351 guides the player to insert the card of the player character operated by the player (S59). When the card is inserted, the CPU 351 reads the recorded game parameter and the like (S60) and determines whether the possible number of sorties recorded on the card remains (S61). When remaining (S61; Yes), the game parameter read as the performance parameter of the player character is set in the player character (S53), and the routine proceeds to the game development (S54, S24).

Meanwhile, when the possible number of sorties is 0, an indication such as "The sortie count of this card is 0. The player robot cannot sortie." is displayed on the guidance screen (S62), and the card is discharged (S63).

When the possible number of sorties is 0 and the AI battery value is also 0 for the inserted card (S52; No sortie remaining, no AI battery remaining), the CPU 351 displays a message such as "The sortie count of this card is 0. The player robot cannot sortie. The AI battery is also 0. The backup robot cannot sortie." (S64). The card is discharged thereafter (S63).

The reading of the ordinary card of the player character and the AI card of the partner character as well as the setting of the read data are thereby conducted.

FIG. 16 to FIG. 20 are explanatory diagrams for explaining the special mission enabling a player who cleared a specific condition to experience a special game stage.

As described above, by accumulating values such as the game parameter with the use of a card, the player may reach various levels not achievable in conventional one-play conclusion type game.

FIG. 16 is a diagram for explaining in detail steps 25 to 27 in foregoing FIG. 8.

When the aforementioned game is deployed (S24) and the game is ended (S25), the CPU 351 checks the game parameter and the like to determine whether anything falls under the mission occurrence condition. For example, as shown in FIG. 17, when the total combat time corresponds to 2 hours, 6 hours, 10 hours, . . . , this falls under the occurrence condition of a top level forced reconnaissance command. Moreover, when 5 V disks (items) are obtained during the game, this falls under a top level special command. In addition, when it is recorded in the player's card that such mission has been experienced, it is possible to avoid generating the same mission.

When falling under the mission occurrence condition (S71; Yes), the CPU 351 displays "emergency contact" on the guidance screen and guides the player to take the card and go to the terminal 10 (S72). The CPU 351 adds the flag setting for setting such mission to the card (S73), renews the card (S26), and discharges the card (S27). When not falling under the mission occurrence condition (S71; No), as usual, the CPU 351 renews the card data (S26) and discharges the card (S27).

Figure 18:
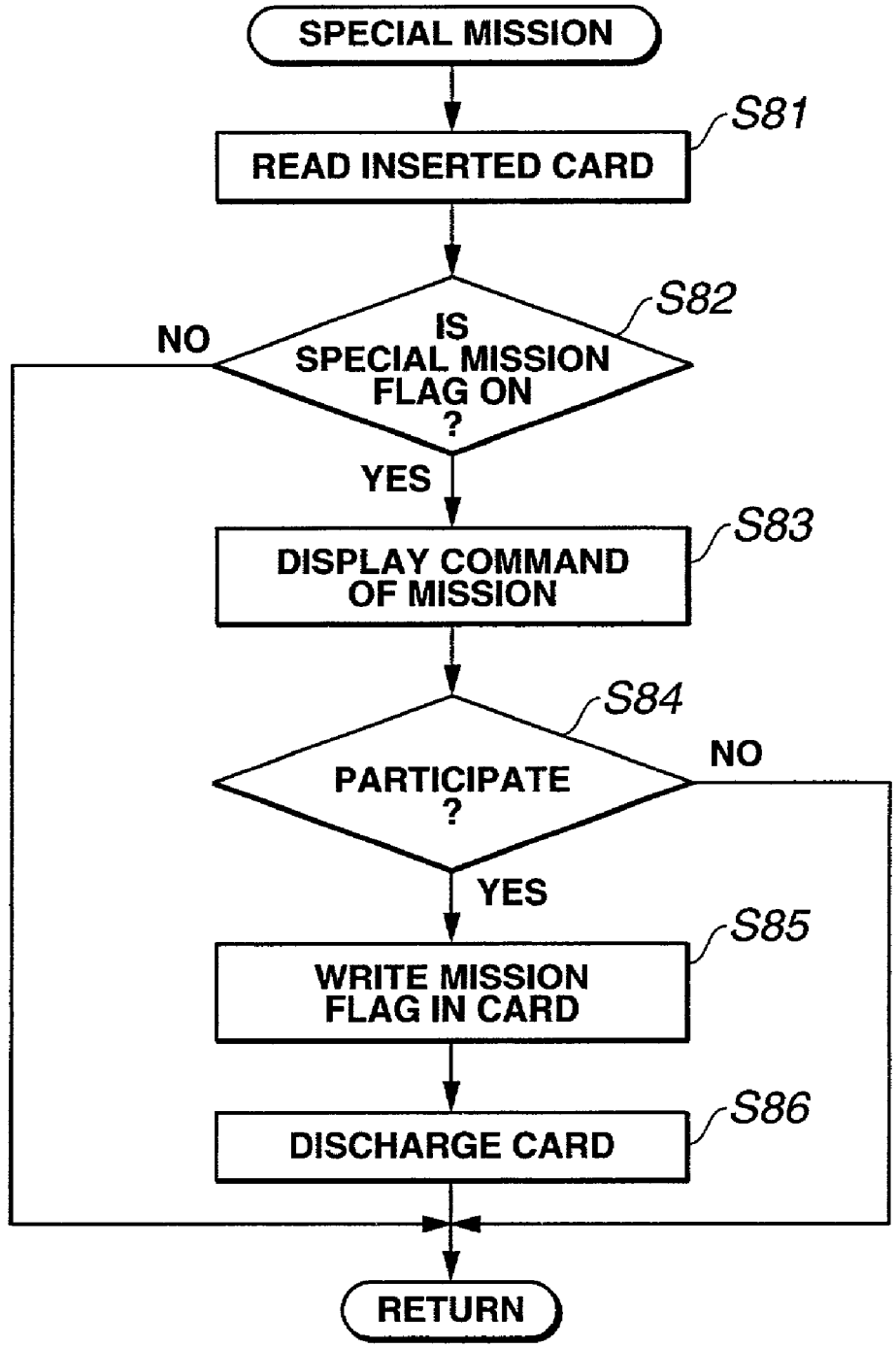
FIG. 18 is a flowchart explaining the setting of a special mission in the terminal.

FIG. 18 is a flowchart for explaining the special mission in the terminal 10.

Figure 19:
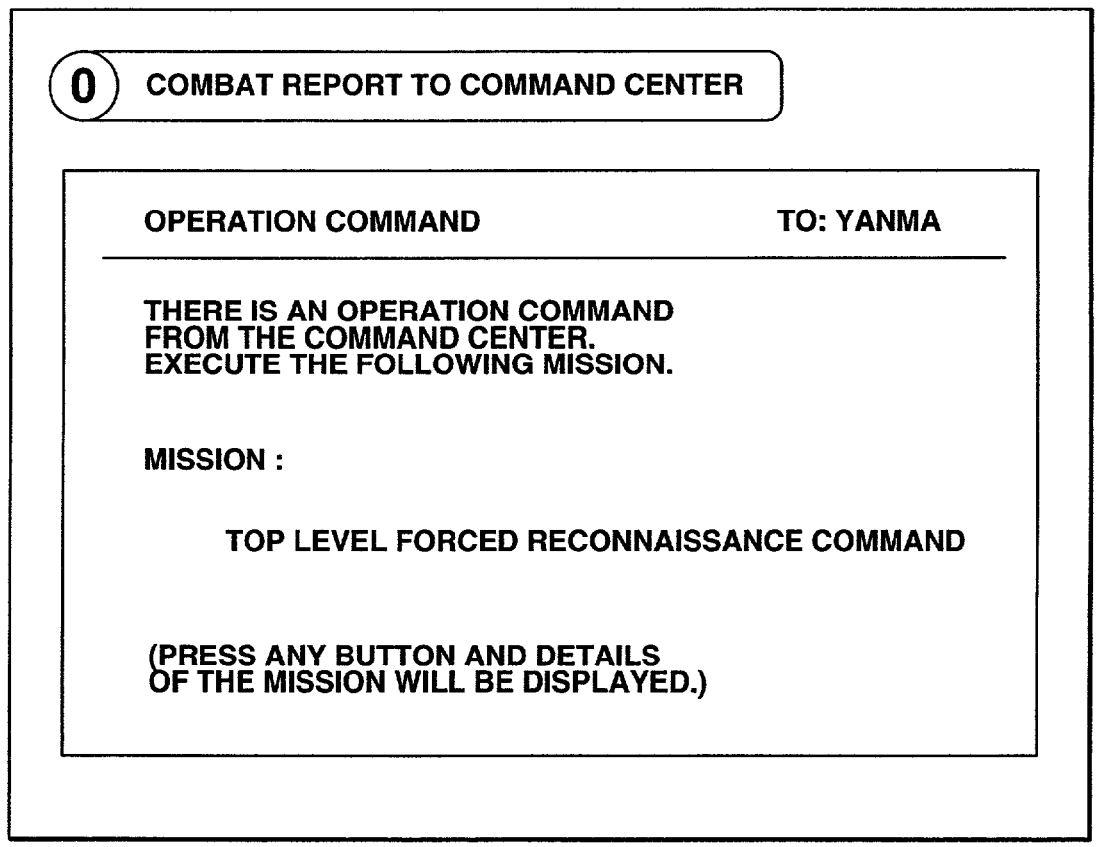
FIG. 19 is an explanatory diagram explaining an example of the guidance screen display of a special mission in the terminal.

The CPU 141 of the terminal 10 reads the card inserted by the player (S81), and, when the special mission flag is set (S82; Yes), displays the mission command on the guidance screen (S83). For example, when a "top level forced reconnaissance command" flag is set in the card, as shown in FIG. 19, a guidance screen is displayed. When the player shows his/her intention of participating by operating buttons or the like (S84; Yes), a mission flag is written in the card (S85). The card is then discharged (S86). When the player shows his/her intention of not participating (S84; No), the routine is ended without writing the mission flag.

Figure 20:
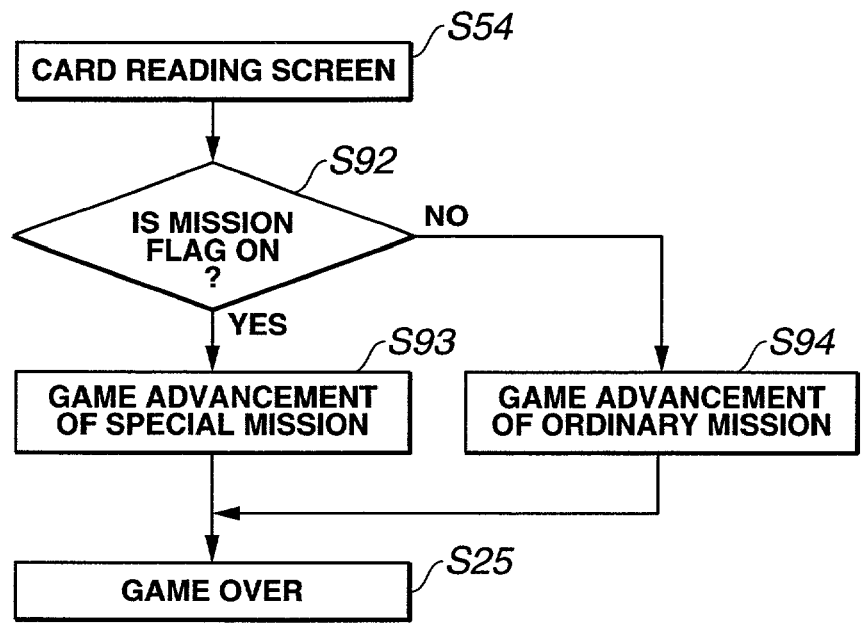
FIG. 20 is a flowchart explaining an execution example of a special mission in the game device.

FIG. 20 is a flowchart for explaining the response of the game device 30 side regarding the card to which the foregoing mission flag has been set (S54).

The card is read in accordance with the flow shown in FIG. 15, and the routine arrives at the card reading guidance screen (S54). When the special mission flag has been set (S92; Yes), the relevant special mission game is deployed (S93), and the game is ended (S25). Moreover, when a special mission flag is not set (S92; No), a battle game of a normal mission is deployed (S94), and the game is ended (S25).

As described above, when play data such as the game parameter accumulated in the card reaches a prescribed condition, the player may experience a special mission that cannot be freely selected in ordinary cases. As examples of such condition, there are the number of times the play data has been recorded on the recording medium, number of times the player played the game, play time, number of times the game has been cleared or has become game over, number of victories or defeats in the game, score or experiential value obtained during the game play, number of executions or success/failure of the special mission game.

Figure 21:
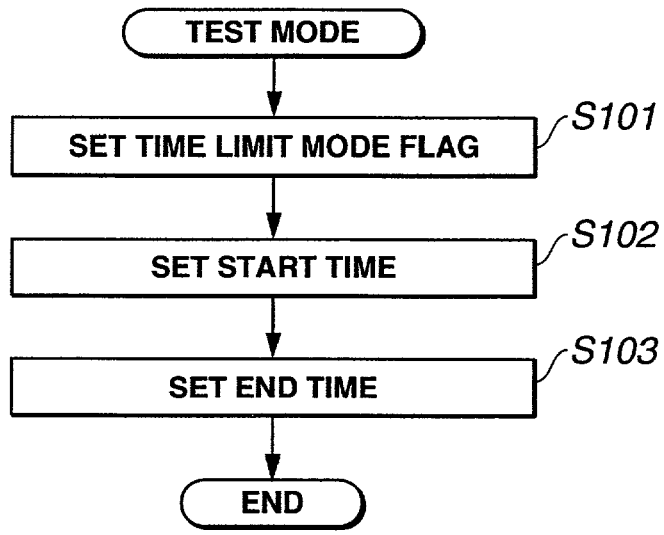
FIG. 21 is a flowchart explaining an example for setting a time limit of a specific game with the test mode.

FIG. 21 is a flowchart for explaining an example of limiting the occurrence of a game such as a special mission that the player may personally experience.

At the amusement center, ordinarily, a plurality of battle game devices are connected with a communication line to enable the simultaneous battle with a plurality of players. When another player joins when a plurality of players are battling; that is, when a so-called intruder joins the game, the game will become more amusing. Thus, when a personal game such as a special mission is conducted, intrusion in most missions will be restricted, and, since the number of players able to participate in the game will simultaneously be reduced, the other players will have to wait.

Here, it is desirable that the battle game device be able to set the personal game for players to be conducted in a time frame when the number of players is comparatively few.

In FIG. 21, a clerk makes the CPU 351 execute a test program mode by conducting prescribed operations. This program sets the flag on for executing a time mode (S101), and sets the time for which the forced battle is turned on (S103). The, as shown in FIG. 22, the contents of the time limit is displayed. In this example, the forced battle mode is set to be turned "ON" from "17:00 to 00:00". The CPU 351 will compare this set time range and the time of the timer 358 periodically during operation, and, when within such time range, a forced battle mode where other players can participate in the game is executed. When outside such time range, the game is restricted to a special mission targeting an individual (one player) in which other player cannot participate in the game.

FIG. 23 is a diagram for explaining the operational example in the game deployment scene (S24) of the partner character (AI character) controlled with the artificial intelligence (AI) of the computer program. In addition, the enemy character may also be controlled with the AI program of such enemy character.

As described above, when the player uses an AI card, the game parameter of the AI partner character is read by the game device 30, and stored in a prescribed space of the memory 352 (S57). This game parameter contains the level value (AI value) for setting the AI mentality of the partner character.

The CPU 351 of the game device 30 executes the control routine of the AI partner character in the virtual space at a prescribed timing during the execution program of the game deployment (S24) for advancing the game upon repeatedly executing the game simulation in frame cycles of the display screen (S200).

Foremost, whether an AI partner character is making an action in the game space is determined with the situation flag value regarding the AI partner character (S202). If the AI partner character is making some kind of action at present (for example, shooting action, jumping down action, etc.), the current situation is determined since other actions cannot be made. For instance, a flag representing a 1024 situation is assigned to the AI partner character, and necessary information can be obtained by referring to the value of the situation flag stored in the memory 352. Further, the level values of the respective game parameters relating to the AI control are also stored in the memory 352. If the AI partner character is not making an action (S202; No), whether the action of the AI partner character has finished is determined with the situation flag (S204). When the action of the AI partner character is finished (S204; Yes), the situation flag representing that the AI partner character is in action is set to OFF (S206). If the action of the AI partner character is not finished (S204; Yes), a new action cannot be set, and, therefore, the character in the present frame will end.

When the AI partner character is not in action (S202; No) and the situation flag representing the in-action is set to OFF (S206), subsequently, the situation flag of the AI partner character is checked, and the situation of the AI partner character is determined. As described above, by reading the 1024 situation flag representing the situation of the AI partner character, the situation of the AI partner character in the virtual space can be comprehended (S208). Next, whether an enemy character attack is approaching the AI partner character is determined by searching the virtual space within a prescribed range (or distance) from the AI partner character (S210). When an attack from the enemy character such as a bullet or missile is approaching (S210; Yes), the AI partner character selects and executes a corresponding action. For instance, in order to avoid the enemy bullet, the AI partner character takes a danger avoidance action such as "jumping". The game parameter is reflected in this kind of danger determination ability or response action of the AI partner character (S212).

For example, in relation to the shooting defense, an "enemy bullet (bullet to become a threat to the player)" is set forth as follows in accordance with the AI cultivation level (AI value), game processing of the AI partner character for each display frame of each game screen is conducted in order to perform the bullet discovering processing. For example, when the AI value is at level 1, the percentage of being able to discover the enemy bullet flying toward oneself is set to 2%. When the AI value is at level 7, the percentage of being able to discover the enemy bullet flying toward oneself is set to 10%. When the AI value is at level 15, the percentage of being able to discover the enemy bullet flying toward oneself is set to 30%. The intermediate values of such AI values are determined by proportionally distributing the percentage. The discovery of the bullet flying toward oneself is determined based on such distribution of percentage.

In other words, when the bullet that will hit the AI partner character comes into view of the AI partner character when there are 30 frames remaining on the time axis of the game deployment, since the AI partner character conducts a check for each frame, there are 30 chances of discovering the bullet. Nevertheless, the percentage of discovering the bullet for each occasion will differ depending on the level of the shooting defense parameter. An AI partner character having a low level may be late in discovering the enemy bullet, or may not discover the enemy bullet at all, and the chances of being hit will increase. An AI partner character having a high level of shooting defense parameter has a high percentage of discovering the enemy bullet at an early stage, and may frequently select the action of avoiding the enemy bullet. When the enemy bullet is not discovered, the AI partner character will be hit with the bullet and incur a damage, and the damage value, which is a type of game parameter, will increase.

When an attack from the enemy character is not detected (S210; No), or after a danger avoidance action or after being hit (S212), whether an enemy character exists in-a range capable of being attacked by the AI partner character is determined (S214). When existing (S214; Yes), whether the AI character falls under a prescribed condition (or mode) of being able to attack the enemy character is determined by checking the flag (S216). When attackable (S216; Yes), the AI partner character will select the attack action against the enemy character, and make the attack (S218). For instance, an attacking means is selected among items such as the laser gun, machine gun, missile, laser sword and the like obtained by the AI partner character during the game and represented with the game parameter in order to attack the enemy character. The success/failure of the attack against the enemy character is reflected in the game parameter. When an enemy character does not exist (S214; No), when the AI character does not make an attack (S216; No), or when the attack is finished (S218), the movement of the AI partner character within the virtual space is selected. For example, the AI partner character is moved to the next area to search for the enemy (S220). Thereafter, this routine is ended and returned to the original processing. This type of routine (S200 to S220) is repeated for each image frame in order to perform control reflecting the game parameter for selecting and executing the various actions of the AI partner character; that is, the character movement of making a more "accurate action" at a more "prompt selection" changes with the AI level in the "various action selection/execution" processing.

In the foregoing example, although the discovery percentage of the enemy attack is set for each occasion in accordance with the AI value in order to reflect the movement or performance of the partner character robot upon executing for each frame regarding the shooting defense action of the AI partner character (S210, S212), the frequency of checking the proximity of the enemy attack (S210) may be set in accordance with the AI value. For instance, although the proximity of the enemy attack is only checked once out of ten frames when the AI value is low, the proximity of the enemy attack is checked for all frames when the AI value is high. Even with this setting, the operational performance of the character can still be represented with the AI level.

Moreover, with the foregoing example, although the action of the AI partner character is determined based on the relationship of the AI partner character and the enemy character, in addition, the AI partner character may observe the action of the player character to determine whether to support the player character, and thereby take a supportive action.

As other embodiments for deploying a game where the foregoing player character and AI partner character jointly deploy the game, there are a "tag match pro wrestling game", "doubles tennis game", "golf game with advising caddie", and so on.

In the case of the pro wrestling game, as the game parameter, there are, for example, "type of technique used by the character (hitting techniques, throwing techniques, pinning techniques for example)", "basic personality of partner character (for example, aggressive, emphasizes follow-ups, belligerent against a specific opponent, etc.)", "closeness with partner character", and so on. Thereby, as the change of the AI partner character pertaining to the AI growth, "percentage of taking an adequate action" or the like will change.

For instance, the AI partner character will change in accordance with the battling style of the player (player character) or enemy character (trend of technique, play time, etc.) and the results thereof (victory/defeat, success/failure of technique, etc.). Specifically, when the player character is pinned by the enemy character, the quickness and percentage of cutting in for rescue (when this percentage is low, the AI partner character will be fighting outside the ring on its own), percentage of the occurrence of a two-platoon technique of launching jointly by the player character and the AI partner character under a prescribed condition, the force thereof, type of technique, and so on may be considered. As the foregoing prescribed condition, for instance, when the player character employs a prescribed technique when the strength of the opponent is below a prescribed value, the partner character will automatically pin the opponent so as to set off a two-platoon technique.

In the case of a doubles tennis game, as the game parameter, there are, for example, "type of ball capable of being hit by the character (for example, hitting techniques, throwing techniques, pinning techniques, etc.)", "quickness of feet", "reaction speed against opponent's ball", "basic personality of partner character (for example, aggressive, emphasizes follow-ups, belligerent against a specific opponent, etc.)", "closeness with partner character", and so on. Thereby, as the change of the AI partner character pertaining to the AI growth, "percentage of taking an adequate action" or the like will change.

For instance, the AI partner character will change in accordance with the playing style of the player (player character) or enemy character, specifically, trend of type of ball and location of return, play time, and the results thereof (victory/defeat, success/failure of technique, etc.).

Moreover, in the case of a "golf game", as the game parameter, there are, for example, "type of ball that can be hit by the character (good at hitting long distance, good at hitting the ball accurately to the desired location, often slicing)", "basic personality of partner character (for example, aggressive, emphasizes follow-ups, etc.)", "closeness with partner character", and so on. Thereby, as the change of the AI partner character pertaining to the AI growth, "percentage of taking an adequate action", "percentage of giving appropriate advice", or the like will change.

Thereby, the AI partner character will change in accordance with the playing style of the player character (trend of action, play time, etc.) and the results thereof (victory/defeat, success/failure of action, etc.).

Incidentally, with a game machine for arcades (business use) and a game machine for domestic use, the method of changing the AI character may be altered. For example, with an arcade game machine, to emphasize the battle balance, the AI character is grown (to become wiser as a result of gaining experience) but the basic performance parameter of each AI character (for example, force of weapons, strength for example, etc.) is not changed, and the growth of the AI character is represented by increasing the "percentage of taking an adequate action". Further, with a domestic game machine, the basic performance itself of the AI character can be changed (for example, increase the strength, increase techniques, etc.). In each of the foregoing embodiments, one among the "basic performance parameter" and "percentage of taking an adequate action" of the AI character may be changed, or both of these may be changed.

According to the embodiments of the present invention described above, since data such as the game parameter is accumulated by using an information recording medium such as a card, the player may experience the continuity of a game that cannot be enjoyed with a battle game that is completed for each game play.

Moreover, since a "rank" is granted in accordance with the player's game technique, the opponent's level can be judged objectively, and the selection of a player with similar techniques as the battle opponent or the challenge against an advanced player is facilitated.

Further, the player will be able to peruse, at any time, the information indicated on the card with the terminal. Thereby, the player will know various numerical values relating to the game play such as the total number of combats, total combat time, number of successful rescues, and so on to enjoy the game.

Incidentally, when it is a one-player game, the AI card, in addition to setting the game parameter of the partner (non-player) character operated with the computer as the comrade, may also be used to set the game parameter of the partner character operated by the comrade player when playing a two-player game.

Moreover, since the AI card is not renewed after the game parameter of the player's card is recorded at the time such AI card is created, the AI character will no longer grow. Nevertheless, the game parameter may be renewed pursuant to the game deployment of the AI character itself. This is amusing since the AI character will grow on its own.

Further, as explained with reference to FIG. 2, the volume of information recordable on the card will be limited when a thin magnetic recordable card is used for the card 20 as the recording medium. Thus, when using a card having a low storage capacity as the AI card, the AI character's level is recorded on this card. And, the AI program or game parameter is previously set for each AI level on the game device 30 side. The game device 30 will combine and use the AI program and game parameter regarding the action of each AI character based on the AI level indicated on the card. Actions (expressions) in which the AI level is reflected on the movement or performance of the AI character are realized thereby.

Moreover, when using a magnetic card or an IC card as the recording medium, characters or the like may be printed on the outside surface thereof to make the game more enjoyable. For instance, previously printed cards may be selected by design or issued randomly in the card issuing device. Further, a recording medium having printed thereon a design corresponding to the character recorded on the recording medium may be paid out. This will also enable the identification of the type of character (robot) recorded on the recording medium.

When the card 20 has a large storage capacity as with an IC card (information recording medium), or when downloading data from a built-in memory (including IC cards) of a portable telephone device or from an online database server (information recording medium) via a portable telephone device, it is possible to make such card or portable device (hereinafter referred to as card etc.) store the game parameter of the AI character or the AI program itself for the game device 30 to control the AI character instead of the aforementioned "AI level". Accordingly, a battle game with the same AI character partner as the comrade in a game device 30 installed in a different location, or a battle game with an AI partner character of a special robot (premium) obtained in the game as the comrade may be enjoyed.

Moreover, the foregoing game program may be stored in a server, and may be downloaded to a computer system, a terminal device, a game device or the like via a communication network. This kind of action falls under "provision via telecommunication circuit".

As explained above, with the information recording medium and game device having recorded thereon the game program of the present invention, the player's battle results may be accumulated and renewed by using a card (recording medium of game data), and a game having continuity with the previous battle game can be enjoyed.

Further, a used card may be used as a performance setting card of a non-player character (for example, a character operated by a computer), which is favorable.

Moreover, it is possible to acquire opportunities for enjoying a special game by accumulating the card data.

In addition, it is possible to restrict the execution of a special game in a specific time frame.

What is claimed is:

1. A method for executing a program on a game device for a game having a player character operated by a player and a partner artificial intelligence (AI) character controlled by a computer, the method comprising:
reading, with a reading device, a recording medium of the player which has recorded thereon play data for the player character, the play data including a possible number of game plays, an issuable number of times for an AI recording medium, and past play data of the player;
determining, if a remainder of the possible number of game plays is zero, that the recording medium of the player is a used recording medium, and displaying guidance for choosing renewal of the recording medium of the player;
issuing, when recording medium renewal is chosen, a new recording medium, the new recording medium storing a new possible number of game plays, the past play data of the player, and the issuable number of times for the AI recording medium;
displaying guidance asking whether or not to store play data for the partner AI character one the recording medium of the player as well as the corresponding past play data of the player character;
determining, when a choice to use the recording medium of the player as the AI recording medium is made, whether the issuable number of times for the AI recording medium is within a prescribed number of times;
issuing, when the issuable number of times for the AI recording medium is within the prescribed number of times, the recording medium of the player as the AI recording medium and writing to the recording medium of the player so that it can function as the AI recording medium;
decreasing the issuable number of times for the AI recording medium and storing the decreased issuable number of times on the new recording medium, in response to the issuance; and
ejecting the new recording medium and the AI recording medium to the outside of the game device.

2. The method according to claim 1, further comprising writing to the recording medium of the player to make it a data read-only medium, when a choice to use the recording medium of the player as the AI recording medium has not been made, or when the issuable number of times for the Al recording medium is not within the prescribed number of times.

3. The method according to claim 1 or 2, wherein a number of times the partner Al character can be used is recorded on the Al recording medium and the use of the partner Al character is limited thereby.

4. The method according to claim 1 or 2, wherein the recording medium of the player is at least one of a magnetic card, an IC card, and an IC memory.

5. The method according to claim 3, wherein the recording medium of the player is at least one of a magnetic card, an IC card, and an IC memory.

* * * * *

UNITED STATES PATENT AND TRADEMARK OFFICE
CERTIFICATE OF CORRECTION

PATENT NO.         : 7,452,279 B2
APPLICATION NO.    : 10/214193
DATED              : November 18, 2008
INVENTOR(S)        : Nobuyuki Yamashita It is certified that error appears in the above-identified patent and that said Letters Patent is hereby corrected as shown below:

In claim 1, column 20, line 28, "(Al)" should read --(AI)--.
In claim 1, column 20, line 33, "Al" should read --AI--.
In claim 1, column 20, line 42, "Al" should read --AI--.
In claim 1, column 20, line 45, "Al" should read --AI--.
In claim 1, column 20, line 45, "one" should read --on--.
In claim 1, column 20, line 49, "Al" should read --AI--.
In claim 1, column 20, line 50, "Al" should read --AI--.
In claim 1, column 20, line 52, "Al" should read --AI--.
In claim 1, column 20, line 54, "Al" should read --AI--.
In claim 1, column 20, line 56, "Al" should read --AI--.
In claim 1, column 20, line 58, "Al" should read --AI--.
In claim 1, column 20, line 62, "Al" should read --AI--.
In claim 2, column 20, line 67, "Al" should read --AI--.
In claim 2, column 21, line 1, "Al" should read --AI--.
In claim 3, column 21, line 5, "Al" should read --AI--.
In claim 3, column 21, line 6, "the Al" should read --the AI--.
In claim 3, column 21, line 6, "partner Al" should read --partner AI--.

Signed and Sealed this

Third Day of November, 2009

David J. Kappos
*Director of the United States Patent and Trademark Office*